(12) United States Patent
Westberg

(10) Patent No.: US 10,986,407 B2
(45) Date of Patent: *Apr. 20, 2021

(54) SYSTEMS AND METHODS FOR PROVIDING PROGRAM SUGGESTIONS IN AN INTERACTIVE TELEVISION PROGRAM GUIDE

(71) Applicant: Rovi Guides, Inc., San Jose, CA (US)

(72) Inventor: Thomas E. Westberg, Stow, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,312

(22) Filed: Jul. 11, 2019

(65) Prior Publication Data

US 2019/0335240 A1    Oct. 31, 2019

Related U.S. Application Data

(63) Continuation of application No. 14/941,981, filed on Nov. 16, 2015, which is a continuation of application
(Continued)

(51) Int. Cl.
*H04N 21/442* (2011.01)
*H04N 21/466* (2011.01)
(Continued)

(52) U.S. Cl.
CPC ......... *H04N 21/4667* (2013.01); *H04N 7/163* (2013.01); *H04N 21/4135* (2013.01);
(Continued)

(58) Field of Classification Search
None
See application file for complete search history.

(56) References Cited

U.S. PATENT DOCUMENTS 4,024,401 A    5/1977  Bernstein et al.
4,081,753 A    3/1978  Miller
(Continued)

FOREIGN PATENT DOCUMENTS

AU    731010    7/1998
AU    733993    2/1999
(Continued)

OTHER PUBLICATIONS

"272OR Satellite Receiver User's Guide," General Instrument, 1991, pp. 58-61.
(Continued)

*Primary Examiner* — Mulugeta Mengesha
*Assistant Examiner* — Charles N Hicks
(74) *Attorney, Agent, or Firm* — Haley Guiliano LLP

(57) ABSTRACT

An interactive television program guide application is provided that queries a user regarding the user's interest in television programs and suggests television programs to the user based on the user's responses. The interactive television program guide application identifies a television program that is potentially of interest to the user. The interactive television program guide application then queries the user regarding the user's interest using questions that are formulated based on attributes associated with the identified television program. Using the user's responses to the questions, the interactive television program guide application identifies and suggests one or more television programs to the user.

20 Claims, 16 Drawing Sheets

Related U.S. Application Data

No. 14/557,077, filed on Dec. 1, 2014, now Pat. No. 9,191,719, which is a continuation of application No. 13/165,209, filed on Jun. 21, 2011, now Pat. No. 8,904,441, which is a continuation of application No. 10/703,989, filed on Nov. 6, 2003, now Pat. No. 7,984,468.

(51) Int. Cl.
| | | |
|---|---|---|
| H04N 7/16 | (2011.01) | |
| H04N 21/45 | (2011.01) | |
| H04N 21/475 | (2011.01) | |
| H04N 21/482 | (2011.01) | |
| H04N 21/47 | (2011.01) | |
| H04N 21/41 | (2011.01) | |

(52) U.S. Cl.
CPC ... *H04N 21/44222* (2013.01); *H04N 21/4532* (2013.01); *H04N 21/4668* (2013.01); *H04N 21/47* (2013.01); *H04N 21/4755* (2013.01); *H04N 21/4756* (2013.01); *H04N 21/4821* (2013.01); *H04N 21/4826* (2013.01)

(56) References Cited

U.S. PATENT DOCUMENTS

| | | | |
|---|---|---|---|
| 4,162,513 | A | 7/1979 | Beyers, Jr. et al. |
| 4,170,782 | A | 10/1979 | Miller |
| 4,271,532 | A | 6/1981 | Wine |
| 4,280,148 | A | 7/1981 | Saxena |
| 4,300,040 | A | 11/1981 | Gould et al. |
| 4,367,559 | A | 1/1983 | Tults |
| 4,375,651 | A | 3/1983 | Templin et al. |
| 4,381,522 | A | 4/1983 | Lambert |
| 4,385,210 | A | 5/1983 | Marquiss |
| 4,390,901 | A | 6/1983 | Keiser |
| 4,425,579 | A | 1/1984 | Merrell |
| 4,429,385 | A | 1/1984 | Cichelli et al. |
| 4,495,654 | A | 1/1985 | Deiss |
| 4,527,194 | A | 7/1985 | Sirazi |
| 4,605,973 | A | 8/1986 | Von Kohorn |
| 4,625,080 | A | 11/1986 | Scott |
| 4,641,205 | A | 2/1987 | Beyers, Jr. |
| 4,645,873 | A | 2/1987 | Chomet |
| 4,677,501 | A | 6/1987 | Saltzman et al. |
| 4,689,022 | A | 8/1987 | Peers et al. |
| 4,691,351 | A | 9/1987 | Hayashi et al. |
| 4,694,490 | A | 9/1987 | Harvey et al. |
| 4,706,121 | A | 11/1987 | Young |
| RE32,632 | E | 3/1988 | Atkinson |
| 4,751,578 | A | 6/1988 | Reiter et al. |
| 4,754,326 | A | 6/1988 | Kram et al. |
| 4,761,684 | A | 8/1988 | Clark et al. |
| 4,775,935 | A | 10/1988 | Yourick |
| 4,787,063 | A | 11/1988 | Muguet |
| 4,829,558 | A | 5/1989 | Welsh |
| 4,857,999 | A | 8/1989 | Welsh |
| 4,882,732 | A | 11/1989 | Kaminaga |
| 4,890,321 | A | 12/1989 | Seth-Smith et al. |
| 4,894,789 | A | 1/1990 | Yee |
| 4,908,707 | A | 3/1990 | Kinghorn |
| 4,908,713 | A | 3/1990 | Levine |
| 4,959,719 | A | 9/1990 | Strubbe et al. |
| 4,963,994 | A | 10/1990 | Levine |
| 4,965,825 | A | 10/1990 | Harvey et al. |
| 4,977,455 | A | 12/1990 | Young |
| 5,014,125 | A | 5/1991 | Pocock et al. |
| 5,016,273 | A | 5/1991 | Hoff |
| 5,027,400 | A | 6/1991 | Baji et al. |
| 5,036,314 | A | 7/1991 | Barillari et al. |
| 5,038,211 | A | 8/1991 | Hallenbeck |
| 5,046,092 | A | 9/1991 | Walker et al. |
| 5,047,867 | A | 9/1991 | Strubbe et al. |
| 5,058,160 | A | 10/1991 | Banker et al. |
| 5,075,771 | A | 12/1991 | Hashimoto |
| 5,089,885 | A | 2/1992 | Clark |
| 5,090,049 | A | 2/1992 | Chen |
| 5,099,319 | A | 3/1992 | Esch et al. |
| 5,113,259 | A | 5/1992 | Romesburg et al. |
| 5,119,188 | A | 6/1992 | McCalley et al. |
| 5,121,476 | A | 6/1992 | Yee |
| 5,126,851 | A | 6/1992 | Yoshimura et al. |
| 5,132,992 | A | 7/1992 | Yurt et al. |
| 5,151,789 | A | 9/1992 | Young |
| 5,152,012 | A | 9/1992 | Schwob |
| 5,155,591 | A | 10/1992 | Wachob |
| 5,170,388 | A | 12/1992 | Endoh |
| 5,179,439 | A | 1/1993 | Hashimoto et al. |
| 5,187,589 | A | 2/1993 | Kono et al. |
| 5,189,630 | A | 2/1993 | Barstow et al. |
| 5,191,423 | A | 3/1993 | Yoshida et al. |
| 5,195,092 | A | 3/1993 | Wilson et al. |
| 5,195,134 | A | 3/1993 | Inoue et al. |
| 5,210,611 | A | 5/1993 | Yee et al. |
| 5,220,420 | A | 6/1993 | Hoarty et al. |
| 5,223,924 | A | 6/1993 | Strubbe |
| 5,231,494 | A | 7/1993 | Wachob |
| RE34,340 | E | 8/1993 | Freeman |
| 5,233,423 | A | 8/1993 | Jernigan et al. |
| 5,247,364 | A | 9/1993 | Banker et al. |
| 5,253,066 | A | 10/1993 | Vogel |
| 5,260,778 | A | 11/1993 | Kauffman et al. |
| 5,262,860 | A | 11/1993 | Fitzpatrick et al. |
| 5,283,639 | A | 2/1994 | Esch et al. |
| 5,283,819 | A | 2/1994 | Glick et al. |
| 5,293,357 | A | 3/1994 | Hallenbeck |
| 5,296,931 | A | 3/1994 | Na |
| 5,297,204 | A | 3/1994 | Levine |
| 5,301,028 | A | 4/1994 | Banker et al. |
| 5,311,423 | A | 5/1994 | Clark |
| 5,317,403 | A | 5/1994 | Keenan |
| 5,323,240 | A | 6/1994 | Amano et al. |
| 5,325,238 | A | 6/1994 | Stebbings et al. |
| 5,325,423 | A | 6/1994 | Lewis |
| 5,335,277 | A | 8/1994 | Harvey et al. |
| 5,347,632 | A | 9/1994 | Filepp et al. |
| 5,353,121 | A | 10/1994 | Young et al. |
| 5,357,276 | A | 10/1994 | Banker et al. |
| 5,359,367 | A | 10/1994 | Stockill |
| 5,371,551 | A | 12/1994 | Logan et al. |
| 5,373,288 | A | 12/1994 | Blahut |
| 5,374,951 | A | 12/1994 | Welsh et al. |
| 5,382,983 | A | 1/1995 | Kwoh et al. |
| 5,396,546 | A | 3/1995 | Remillard |
| 5,398,138 | A | 3/1995 | Tomita |
| 5,404,393 | A | 4/1995 | Remillard |
| 5,410,326 | A | 4/1995 | Goldstein |
| 5,410,343 | A | 4/1995 | Coddington et al. |
| 5,410,344 | A | 4/1995 | Graves et al. |
| 5,410,367 | A | 4/1995 | Zahavi et al. |
| 5,412,720 | A | 5/1995 | Hoarty |
| 5,414,426 | A | 5/1995 | O'Donnell et al. |
| 5,414,756 | A | 5/1995 | Levine |
| 5,432,561 | A | 7/1995 | Strubbe |
| 5,438,355 | A | 8/1995 | Palmer |
| 5,444,499 | A | 8/1995 | Saitoh |
| 5,446,919 | A | 8/1995 | Wilkins |
| 5,455,570 | A | 10/1995 | Cook et al. |
| 5,457,478 | A | 10/1995 | Frank |
| 5,459,522 | A | 10/1995 | Pint |
| 5,465,113 | A | 11/1995 | Gilboy |
| 5,465,385 | A | 11/1995 | Ohga et al. |
| 5,469,206 | A | 11/1995 | Strubbe et al. |
| 5,477,262 | A | 12/1995 | Banker et al. |
| 5,479,266 | A | 12/1995 | Young et al. |
| 5,479,268 | A | 12/1995 | Young et al. |
| 5,481,296 | A | 1/1996 | Cragun et al. |
| 5,483,278 | A | 1/1996 | Strubbe et al. |
| 5,485,197 | A | 1/1996 | Hoarty |
| 5,485,219 | A | 1/1996 | Woo et al. |
| 5,485,221 | A | 1/1996 | Banker et al. |
| 5,488,409 | A | 1/1996 | Yuen et al. |
| 5,502,504 | A | 3/1996 | Marshall et al. |

(56) References Cited

U.S. PATENT DOCUMENTS

| | | |
|---|---|---|
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,532,754 A | 7/1996 | Young et al. |
| 5,537,141 A | 7/1996 | Harper et al. |
| 5,543,933 A | 8/1996 | Kang et al. |
| 5,544,321 A | 8/1996 | Theimer et al. |
| 5,550,578 A | 8/1996 | Hoarty et al. |
| 5,550,863 A | 8/1996 | Yurt et al. |
| 5,553,221 A | 9/1996 | Reimer et al. |
| 5,561,709 A | 10/1996 | Remillard |
| 5,563,665 A | 10/1996 | Chang |
| 5,576,951 A | 11/1996 | Lockwood |
| 5,579,239 A | 11/1996 | Freeman et al. |
| 5,581,479 A | 12/1996 | McLaughlin et al. |
| 5,583,561 A | 12/1996 | Baker |
| 5,583,576 A | 12/1996 | Perlman et al. |
| 5,594,490 A | 1/1997 | Dawson et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,600,573 A | 2/1997 | Hendricks et al. |
| 5,606,374 A | 2/1997 | Bertram |
| 5,610,653 A | 3/1997 | Abecassis |
| 5,616,876 A | 4/1997 | Cluts |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,693 A | 4/1997 | Rohatgi et al. |
| 5,629,733 A | 5/1997 | Youman et al. |
| 5,630,119 A | 5/1997 | Aristides et al. |
| 5,631,995 A | 5/1997 | Weissensteiner et al. |
| 5,634,051 A | 5/1997 | Thomson |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,648,824 A | 7/1997 | Dunn et al. |
| 5,650,831 A | 7/1997 | Farwell |
| 5,652,613 A | 7/1997 | Lazarus et al. |
| 5,654,748 A | 8/1997 | Matthews, III |
| 5,657,072 A | 8/1997 | Aristides et al. |
| 5,659,350 A | 8/1997 | Hendricks et al. |
| 5,659,366 A | 8/1997 | Kerman |
| 5,659,742 A | 8/1997 | Beattie et al. |
| 5,661,517 A | 8/1997 | Budow et al. |
| 5,663,757 A | 9/1997 | Morales |
| 5,666,293 A | 9/1997 | Metz et al. |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,687,331 A | 11/1997 | Volk et al. |
| 5,689,648 A | 11/1997 | Diaz et al. |
| 5,689,663 A | 11/1997 | Williams |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A | 12/1997 | Lawler et al. |
| 5,699,125 A | 12/1997 | Rzeszewski et al. |
| 5,699,528 A | 12/1997 | Hogan |
| 5,708,478 A | 1/1998 | Tognazzini |
| 5,708,767 A | 1/1998 | Yeo et al. |
| 5,708,780 A | 1/1998 | Levergood et al. |
| 5,710,601 A | 1/1998 | Marshall et al. |
| 5,710,815 A | 1/1998 | Ming et al. |
| 5,710,884 A | 1/1998 | Dedrick |
| 5,717,923 A | 2/1998 | Dedrick |
| 5,721,829 A | 2/1998 | Dunn et al. |
| 5,722,041 A | 2/1998 | Freadman |
| 5,724,103 A | 3/1998 | Batchelor |
| 5,724,521 A | 3/1998 | Dedrick |
| 5,724,525 A | 3/1998 | Beyers, II et al. |
| 5,724,567 A | 3/1998 | Rose et al. |
| 5,726,702 A | 3/1998 | Hamaguchi et al. |
| 5,727,060 A | 3/1998 | Young |
| 5,731,844 A | 3/1998 | Rauch et al. |
| 5,734,720 A | 3/1998 | Salganicoff |
| 5,734,853 A | 3/1998 | Hendricks et al. |
| 5,734,893 A | 3/1998 | Li et al. |
| 5,737,552 A | 4/1998 | Lavallee et al. |
| 5,740,231 A | 4/1998 | Cohn et al. |
| 5,740,549 A | 4/1998 | Reilly et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,081 A | 5/1998 | Whiteis |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,606 A | 6/1998 | Wolzien |
| 5,768,528 A | 6/1998 | Stumm |
| 5,771,354 A | 6/1998 | Crawford |
| 5,774,170 A | 6/1998 | Hite et al. |
| 5,774,357 A | 6/1998 | Hoffberg et al. |
| 5,774,534 A | 6/1998 | Mayer |
| 5,774,664 A | 6/1998 | Hidary et al. |
| 5,774,859 A | 6/1998 | Houser et al. |
| 5,778,181 A | 7/1998 | Hidary et al. |
| 5,778,182 A | 7/1998 | Cathey et al. |
| 5,781,228 A | 7/1998 | Sposato |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,198 A | 8/1998 | Roop et al. |
| 5,790,201 A | 8/1998 | Antos |
| 5,790,202 A | 8/1998 | Kummer et al. |
| 5,790,426 A | 8/1998 | Robinson |
| 5,790,753 A | 8/1998 | Krishnamoorthy et al. |
| 5,793,964 A | 8/1998 | Rogers et al. |
| 5,793,972 A | 8/1998 | Shane et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,167 A | 9/1998 | van Cruyningen |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,809,204 A | 9/1998 | Young et al. |
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,931 A | 9/1998 | Yuen |
| 5,815,145 A | 9/1998 | Matthews, III |

(56) References Cited

U.S. PATENT DOCUMENTS

| | | |
|---|---|---|
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,818,935 A | 10/1998 | Maa |
| 5,819,019 A | 10/1998 | Nelson |
| 5,819,156 A | 10/1998 | Belmont |
| 5,819,284 A | 10/1998 | Farber et al. |
| 5,819,285 A | 10/1998 | Damico et al. |
| 5,822,123 A | 10/1998 | Davis et al. |
| 5,825,407 A | 10/1998 | Cowe et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,842,010 A | 11/1998 | Jain et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,823 A | 1/1999 | Levitan |
| 5,867,226 A | 2/1999 | Wehmeyer et al. |
| 5,867,233 A | 2/1999 | Tanaka et al. |
| 5,870,754 A | 2/1999 | Dimitrova et al. |
| 5,872,588 A | 2/1999 | Aras et al. |
| 5,873,660 A | 2/1999 | Walsh et al. |
| 5,874,985 A | 2/1999 | Matthews, III |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A | 3/1999 | Lemmons et al. |
| 5,883,677 A | 3/1999 | Hofmann |
| 5,886,732 A | 3/1999 | Humpleman |
| 5,889,950 A | 3/1999 | Kuzma |
| 5,890,138 A | 3/1999 | Godin et al. |
| 5,892,535 A | 4/1999 | Allen et al. |
| 5,892,536 A | 4/1999 | Logan et al. |
| 5,892,767 A | 4/1999 | Bell et al. |
| 5,895,474 A | 4/1999 | Maarek et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,865 A | 5/1999 | Palmer et al. |
| 5,907,322 A | 5/1999 | Kelly et al. |
| 5,907,323 A | 5/1999 | Lawler et al. |
| 5,907,366 A | 5/1999 | Farmer et al. |
| 5,912,664 A | 6/1999 | Eick et al. |
| 5,914,712 A | 6/1999 | Sartain et al. |
| 5,914,746 A | 6/1999 | Matthews, III et al. |
| 5,915,026 A | 6/1999 | Mankovitz |
| 5,915,250 A | 6/1999 | Jain et al. |
| 5,917,481 A | 6/1999 | Rzeszewski et al. |
| 5,917,830 A | 6/1999 | Chen et al. |
| 5,918,014 A | 6/1999 | Robinson |
| 5,918,213 A | 6/1999 | Bernard et al. |
| 5,920,700 A | 7/1999 | Gordon et al. |
| 5,920,842 A | 7/1999 | Cooper et al. |
| 5,923,848 A | 7/1999 | Goodhand et al. |
| 5,929,849 A | 7/1999 | Kikinis |
| 5,929,850 A | 7/1999 | Broadwin et al. |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,945,988 A | 8/1999 | Williams et al. |
| 5,946,386 A | 8/1999 | Rogers et al. |
| 5,949,954 A | 9/1999 | Young et al. |
| 5,955,988 A | 9/1999 | Blonstein et al. |
| 5,956,716 A | 9/1999 | Kenner et al. |
| 5,959,688 A | 9/1999 | Schein et al. |
| 5,960,411 A | 9/1999 | Hartman et al. |
| 5,973,683 A | 10/1999 | Cragun et al. |
| 5,977,964 A | 11/1999 | Williams et al. |
| 5,983,236 A | 11/1999 | Yager et al. |
| 5,986,650 A | 11/1999 | Ellis et al. |
| 5,987,213 A | 11/1999 | Mankovitz et al. |
| 5,988,078 A | 11/1999 | Levine |
| 5,990,890 A | 11/1999 | Etheredge |
| 5,990,927 A | 11/1999 | Hendricks et al. |
| 5,991,799 A | 11/1999 | Yen et al. |
| 6,002,393 A | 12/1999 | Hite et al. |
| 6,002,394 A | 12/1999 | Schein et al. |
| 6,002,443 A | 12/1999 | Iggulden |
| 6,002,444 A | 12/1999 | Marshall et al. |
| 6,003,030 A | 12/1999 | Kenner et al. |
| 6,005,561 A | 12/1999 | Hawkins et al. |
| 6,005,563 A | 12/1999 | White et al. |
| 6,005,565 A | 12/1999 | Legall et al. |
| 6,005,566 A | 12/1999 | Jones et al. |
| 6,005,597 A | 12/1999 | Barrett et al. |
| 6,006,257 A | 12/1999 | Slezak |
| 6,008,802 A | 12/1999 | Iki et al. |
| 6,008,803 A | 12/1999 | Rowe et al. |
| 6,011,546 A | 1/2000 | Bertram |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,023,267 A | 2/2000 | Chapuis et al. |
| 6,025,837 A | 2/2000 | Matthews, III et al. |
| 6,028,599 A | 2/2000 | Yuen et al. |
| 6,029,045 A | 2/2000 | Picco et al. |
| 6,029,195 A | 2/2000 | Herz |
| 6,035,091 A | 3/2000 | Kazo |
| 6,049,824 A | 4/2000 | Simonin |
| 6,052,145 A | 4/2000 | Macrae et al. |
| 6,058,238 A | 5/2000 | Ng |
| 6,064,980 A | 5/2000 | Jacobi et al. |
| 6,065,047 A | 5/2000 | Carpenter et al. |
| 6,067,561 A | 5/2000 | Dillon |
| 6,072,460 A | 6/2000 | Marshall et al. |
| 6,075,526 A | 6/2000 | Rothmuller |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,091,884 A | 7/2000 | Yuen et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,112,186 A | 8/2000 | Bergh et al. |
| 6,119,098 A | 9/2000 | Guyot et al. |
| 6,119,101 A | 9/2000 | Peckover |
| 6,122,011 A | 9/2000 | Dias et al. |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,141,003 A | 10/2000 | Chor et al. |
| 6,151,059 A | 11/2000 | Schein et al. |
| 6,151,643 A | 11/2000 | Cheng et al. |
| 6,157,411 A | 12/2000 | Williams et al. |
| 6,160,545 A | 12/2000 | Eyer et al. |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |

(56) References Cited

U.S. PATENT DOCUMENTS

| | | |
|---|---|---|
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,202,212 B1 | 3/2001 | Sturgeon et al. |
| 6,208,384 B1 | 3/2001 | Schultheiss |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,233,734 B1 | 5/2001 | Macrae et al. |
| 6,237,049 B1 | 5/2001 | Ludtke |
| 6,239,794 B1 | 5/2001 | Yuen et al. |
| 6,240,555 B1 | 5/2001 | Shoff et al. |
| 6,256,785 B1 | 7/2001 | Klappert et al. |
| 6,262,722 B1 | 7/2001 | Allison et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,266,814 B1 | 7/2001 | Lemmons et al. |
| 6,268,849 B1 | 7/2001 | Boyer et al. |
| 6,275,268 B1 | 8/2001 | Ellis et al. |
| 6,289,346 B1 | 9/2001 | Milewski et al. |
| 6,298,482 B1 | 10/2001 | Seidman et al. |
| 6,310,886 B1 | 10/2001 | Barton |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,327,049 B1 | 12/2001 | Ohtsuka |
| 6,331,877 B1 | 12/2001 | Bennington et al. |
| 6,335,963 B1 | 1/2002 | Bosco |
| 6,341,374 B2 | 1/2002 | Schein et al. |
| 6,357,042 B2 | 3/2002 | Srinivasan et al. |
| 6,357,043 B1 | 3/2002 | Ellis et al. |
| 6,359,636 B1 | 3/2002 | Schindler et al. |
| 6,363,525 B1 | 3/2002 | Dougherty et al. |
| 6,373,528 B1 | 4/2002 | Bennington et al. |
| 6,388,714 B1 | 5/2002 | Schein et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,498,895 B2 | 12/2002 | Young et al. |
| 6,499,138 B1 | 12/2002 | Swix et al. |
| 6,505,348 B1 | 1/2003 | Knowles et al. |
| 6,509,908 B1 | 1/2003 | Croy et al. |
| 6,515,680 B1 | 2/2003 | Hendricks et al. |
| 6,516,467 B1 | 2/2003 | Schindler et al. |
| 6,526,577 B1 | 2/2003 | Knudson et al. |
| 6,539,548 B1 | 3/2003 | Hendricks et al. |
| 6,545,722 B1 | 4/2003 | Schultheiss et al. |
| 6,546,399 B1 | 4/2003 | Reed et al. |
| 6,564,378 B1 | 5/2003 | Satterfield et al. |
| 6,564,379 B1 | 5/2003 | Knudson et al. |
| 6,567,982 B1 | 5/2003 | Howe et al. |
| 6,571,390 B1 | 5/2003 | Dunn et al. |
| 6,588,013 B1 | 7/2003 | Lumley et al. |
| 6,600,503 B2 | 7/2003 | Stautner et al. |
| 6,611,654 B1 | 8/2003 | Shteyn |
| 6,622,306 B1 | 9/2003 | Kamada |
| 6,631,523 B1 | 10/2003 | Matthews, III et al. |
| 6,661,468 B2 | 12/2003 | Alten et al. |
| 6,665,869 B1 | 12/2003 | Ellis et al. |
| 6,668,377 B1 | 12/2003 | Dunn |
| 6,675,385 B1 | 1/2004 | Wang |
| 6,675,386 B1 | 1/2004 | Hendricks et al. |
| 6,696,373 B2 | 2/2004 | Kinn et al. |
| 6,698,020 B1 | 2/2004 | Zigmond et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,754,904 B1 | 6/2004 | Cooper et al. |
| 6,756,997 B1 | 6/2004 | Ward, III et al. |
| 6,760,537 B2 | 7/2004 | Mankovitz |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,925,567 B1 | 8/2005 | Hirata et al. |
| 6,947,935 B1 | 9/2005 | Horvitz |
| 6,973,669 B2 | 12/2005 | Daniels |
| 6,983,478 B1 | 1/2006 | Grauch et al. |
| 6,983,483 B2 | 1/2006 | Maze et al. |
| 7,003,792 B1 | 2/2006 | Yuen |
| 7,013,478 B1 | 3/2006 | Hendricks et al. |
| 7,028,323 B2 | 4/2006 | Franken et al. |
| 7,028,326 B1 | 4/2006 | Westlake et al. |
| 7,039,935 B2 | 5/2006 | Knudson et al. |
| 7,047,241 B1 | 5/2006 | Erickson |
| 7,050,988 B2 | 5/2006 | Atcheson et al. |
| 7,058,635 B1 | 6/2006 | Shah-Nazaroff et al. |
| 7,069,576 B1 | 6/2006 | Knudson et al. |
| 7,127,402 B2 | 10/2006 | Ross et al. |
| 7,134,131 B1 | 11/2006 | Hendricks et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,243,139 B2 | 7/2007 | Ullman et al. |
| 7,266,833 B2 | 9/2007 | Ward, III et al. |
| 7,287,267 B2 | 10/2007 | Knudson et al. |
| 7,293,276 B2 | 11/2007 | Phillips et al. |
| 7,328,450 B2 | 2/2008 | Macrae et al. |
| 7,349,976 B1 | 3/2008 | Glaser et al. |
| 7,363,645 B1 | 4/2008 | Hendricks |
| 7,392,532 B2 | 6/2008 | White et al. |
| 7,437,751 B2 | 10/2008 | Daniels |
| 7,480,929 B2 | 1/2009 | Klosterman et al. |
| 7,493,641 B2 | 2/2009 | Klosterman et al. |
| 7,503,055 B2 | 3/2009 | Reynolds et al. |
| 7,540,010 B2 | 5/2009 | Hanaya et al. |
| 7,665,109 B2 | 2/2010 | Matthews, III et al. |
| 7,721,307 B2 | 5/2010 | Hendricks et al. |
| 7,721,320 B2 | 5/2010 | Wennerstrom et al. |
| 7,757,254 B2 | 7/2010 | Shoff et al. |
| 7,770,196 B1 | 8/2010 | Hendricks |
| 8,078,751 B2 | 12/2011 | Janik et al. |
| 8,112,776 B2 | 2/2012 | Schein et al. |
| 8,904,441 B2 | 12/2014 | Westberg |
| 9,191,719 B2* | 11/2015 | Westberg ........... H04N 5/44543 |
| 10,484,740 B2* | 11/2019 | Westberg ......... H04N 21/44222 |
| 2001/0001160 A1 | 5/2001 | Shoff et al. |
| 2001/0029610 A1 | 10/2001 | Corvin et al. |
| 2001/0034740 A1 | 10/2001 | Kerne |
| 2001/0042246 A1 | 11/2001 | Yuen et al. |
| 2001/0047298 A1 | 11/2001 | Moore et al. |
| 2001/0049820 A1 | 12/2001 | Barton |
| 2002/0026496 A1 | 2/2002 | Boyer et al. |
| 2002/0032907 A1 | 3/2002 | Daniels |
| 2002/0042913 A1 | 4/2002 | Ellis et al. |
| 2002/0042914 A1 | 4/2002 | Walker et al. |
| 2002/0048448 A1 | 4/2002 | Daniels |
| 2002/0059599 A1 | 5/2002 | Schein et al. |
| 2002/0059602 A1 | 5/2002 | Macrae et al. |
| 2002/0059610 A1* | 5/2002 | Ellis .................. H04N 21/4882 725/58 |
| 2002/0072989 A1 | 6/2002 | Van De Sluis |
| 2002/0073424 A1 | 6/2002 | Ward et al. |
| 2002/0083439 A1 | 6/2002 | Eldering |
| 2002/0092017 A1 | 7/2002 | Klosterman et al. |
| 2002/0112249 A1 | 8/2002 | Hendricks et al. |

(56) References Cited

U.S. PATENT DOCUMENTS

| | | |
|---|---|---|
| 2002/0124249 A1 | 9/2002 | Shintani et al. |
| 2002/0129368 A1 | 9/2002 | Schlack et al. |
| 2002/0138840 A1 | 9/2002 | Schein et al. |
| 2002/0184626 A1 | 12/2002 | Darbee et al. |
| 2002/0188948 A1 | 12/2002 | Florence |
| 2002/0194596 A1 | 12/2002 | Srivastava |
| 2003/0005432 A1 | 1/2003 | Ellis et al. |
| 2003/0005445 A1 | 1/2003 | Schein et al. |
| 2003/0028889 A1* | 2/2003 | McCoskey .............. G06F 21/10 725/91 |
| 2003/0031465 A1 | 2/2003 | Blake |
| 2003/0061239 A1 | 3/2003 | Yoon |
| 2003/0110499 A1 | 6/2003 | Knudson et al. |
| 2003/0115602 A1 | 6/2003 | Knee et al. |
| 2003/0126607 A1 | 7/2003 | Phillips |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2003/0225777 A1 | 12/2003 | Marsh |
| 2004/0049787 A1 | 3/2004 | Maissel et al. |
| 2004/0073482 A1 | 4/2004 | Wiggins et al. |
| 2004/0078809 A1 | 4/2004 | Drazin |
| 2004/0078815 A1 | 4/2004 | Lemmons et al. |
| 2004/0103439 A1 | 5/2004 | Macrae et al. |
| 2004/0111742 A1 | 6/2004 | Hendricks et al. |
| 2004/0111745 A1 | 6/2004 | Schein et al. |
| 2004/0133655 A1 | 7/2004 | Yen et al. |
| 2004/0139465 A1 | 7/2004 | Matthews et al. |
| 2004/0194131 A1 | 9/2004 | Ellis et al. |
| 2004/0194138 A1 | 9/2004 | Boylan et al. |
| 2004/0210935 A1 | 10/2004 | Schein et al. |
| 2004/0216158 A1 | 10/2004 | Blas |
| 2004/0221310 A1 | 11/2004 | Herrington et al. |
| 2005/0015815 A1 | 1/2005 | Shoff et al. |
| 2005/0097622 A1 | 5/2005 | Zigmond et al. |
| 2005/0138660 A1 | 6/2005 | Boyer et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204388 A1 | 9/2005 | Knudson et al. |
| 2005/0229215 A1 | 10/2005 | Schein et al. |
| 2005/0235320 A1 | 10/2005 | Maze et al. |
| 2005/0244138 A1 | 11/2005 | O'Connor et al. |
| 2005/0262542 A1 | 11/2005 | DeWeese et al. |
| 2005/0267819 A1 | 12/2005 | Kaplan |
| 2005/0278741 A1 | 12/2005 | Robarts et al. |
| 2005/0283796 A1 | 12/2005 | Flickinger |
| 2005/0283800 A1 | 12/2005 | Ellis et al. |
| 2006/0037044 A1 | 2/2006 | Daniels |
| 2007/0271582 A1 | 11/2007 | Ellis et al. |
| 2008/0178221 A1 | 7/2008 | Schein et al. |
| 2008/0184305 A1 | 7/2008 | Schein et al. |
| 2008/0184308 A1 | 7/2008 | Herrington et al. |
| 2008/0184315 A1 | 7/2008 | Ellis et al. |
| 2008/0184319 A1 | 7/2008 | Mankovitz |
| 2008/0188213 A1 | 8/2008 | Mankovitz |
| 2008/0189744 A1 | 8/2008 | Schein et al. |
| 2008/0235725 A1 | 9/2008 | Hendricks |
| 2008/0288980 A1 | 11/2008 | Schein et al. |
| 2009/0031335 A1 | 1/2009 | Hendricks et al. |
| 2009/0070817 A1 | 3/2009 | Ellis et al. |
| 2009/0077589 A1 | 3/2009 | Boyer et al. |
| 2010/0115413 A1 | 5/2010 | Schein et al. |
| 2010/0115541 A1 | 5/2010 | Schein et al. |
| 2010/0175084 A1 | 7/2010 | Ellis et al. |
| 2010/0211969 A1 | 8/2010 | Schein et al. |
| 2010/0211975 A1 | 8/2010 | Boyer et al. |
| 2011/0047487 A1 | 2/2011 | DeWeese et al. |
| 2011/0173660 A1 | 7/2011 | Schein et al. |
| 2011/0185387 A1 | 7/2011 | Schein et al. |
| 2011/0209170 A1 | 8/2011 | Schein et al. |
| 2011/0258663 A1 | 10/2011 | Lemmons et al. |
| 2012/0079539 A1 | 3/2012 | Schein et al. |
| 2012/0272270 A1 | 10/2012 | Boyer et al. |
| 2013/0304586 A1 | 11/2013 | Angles et al. |

FOREIGN PATENT DOCUMENTS

| | | |
|---|---|---|
| CA | 1 030 505 | 5/1978 |
| CA | 1 187 197 | 5/1985 |
| CA | 1 188 811 | 6/1985 |
| CA | 1 196 082 | 10/1985 |
| CA | 1 200 911 | 2/1986 |
| CA | 2 151 458 | 6/1994 |
| CA | 2 345 161 | 6/1994 |
| CA | 2 164 608 | 12/1994 |
| CA | 2 312 326 | 6/1999 |
| CN | 1567986 | 1/2005 |
| DE | 29 18 846 | 11/1980 |
| DE | 31 51 492 | 7/1983 |
| DE | 32 46 225 | 6/1984 |
| DE | 33 37 204 | 4/1985 |
| DE | 36 21 263 | 1/1988 |
| DE | 36 40 436 | 6/1988 |
| DE | 39 09 334 | 9/1990 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 40 419 | 5/1996 |
| DE | 19 531 121 A1 | 2/1997 |
| DE | 19 740 079 A1 | 3/1999 |
| DE | 199 31 046 | 1/2001 |
| EP | 0 072 153 | 2/1983 |
| EP | 0 276 425 | 8/1988 |
| EP | 0 339 675 | 11/1989 |
| EP | 0 396 062 | 11/1990 |
| EP | 0 401 930 | 12/1990 |
| EP | 0 408 892 | 1/1991 |
| EP | 0 420 123 | 4/1991 |
| EP | 0 424 648 | 5/1991 |
| EP | 0 444 496 | 9/1991 |
| EP | 0 447 968 | 9/1991 |
| EP | 0 463 451 | 1/1992 |
| EP | 0 477 754 | 4/1992 |
| EP | 0 477 756 | 4/1992 |
| EP | 0 492 853 | 7/1992 |
| EP | 0 532 322 | 3/1993 |
| EP | 0 550 911 | 7/1993 |
| EP | 0 560 593 | 9/1993 |
| EP | 0 572 090 | 12/1993 |
| EP | 0 575 956 | 12/1993 |
| EP | 0 617 563 | 9/1994 |
| EP | 0 624 040 | 11/1994 |
| EP | 0 644 689 | 3/1995 |
| EP | 0 650 114 | 4/1995 |
| EP | 0 658 048 | 6/1995 |
| EP | 0 682 452 | 11/1995 |
| EP | 0 705 036 | 4/1996 |
| EP | 0 721 253 | 7/1996 |
| EP | 0 723 369 | 7/1996 |
| EP | 0 725 539 | 8/1996 |
| EP | 0 742 669 | 11/1996 |
| EP | 0 752 767 | 1/1997 |
| EP | 0 753 964 | 1/1997 |
| EP | 0 762 751 | 3/1997 |
| EP | 0 772 360 | 5/1997 |
| EP | 0 774 853 | 5/1997 |
| EP | 0 774 866 | 5/1997 |
| EP | 0 774 868 | 5/1997 |
| EP | 0 775 417 | 5/1997 |
| EP | 0 784 405 | 7/1997 |
| EP | 0 789 488 | 8/1997 |
| EP | 0 793 225 | 9/1997 |
| EP | 0 239 884 | 10/1997 |
| EP | 0805594 A2 | 11/1997 |
| EP | 0 822 718 | 2/1998 |
| EP | 0 827 340 | 3/1998 |

(56) References Cited

FOREIGN PATENT DOCUMENTS

| | | |
|---|---|---|
| EP | 0 834 798 | 4/1998 |
| EP | 0 837 599 | 4/1998 |
| EP | 0 848 554 | 6/1998 |
| EP | 0 849 948 | 6/1998 |
| EP | 0 851 681 | 7/1998 |
| EP | 0 852 361 | 7/1998 |
| EP | 0 852 442 | 7/1998 |
| EP | 0 854 645 | 7/1998 |
| EP | 0 854 654 | 7/1998 |
| EP | 0 880 856 | 12/1998 |
| EP | 0 892 554 | 1/1999 |
| EP | 0 905 985 | 3/1999 |
| EP | 0 924 927 | 6/1999 |
| EP | 0 935 393 | 8/1999 |
| EP | 0 944 253 | 9/1999 |
| EP | 0 963 119 | 12/1999 |
| EP | 0 988 876 | 3/2000 |
| EP | 1 095 504 | 5/2001 |
| FR | 2662895 | 12/1991 |
| GB | 1 554 411 | 10/1979 |
| GB | 2 034 995 | 6/1980 |
| GB | 2 126 002 | 3/1984 |
| GB | 2 185 670 | 7/1987 |
| GB | 2 256 546 | 12/1992 |
| GB | 2 265 792 | 10/1993 |
| GB | 2 309 134 | 7/1997 |
| GB | 2 325 537 | 11/1998 |
| JP | 58-137334 | 8/1983 |
| JP | 58-196738 | 11/1983 |
| JP | 58-210776 | 12/1983 |
| JP | 59-141878 | 8/1984 |
| JP | 06-061935 | 4/1985 |
| JP | 61-050470 | 3/1986 |
| JP | 61-074476 | 4/1986 |
| JP | 62-060370 | 3/1987 |
| JP | 62-060372 | 3/1987 |
| JP | 62-060384 | 3/1987 |
| JP | 63-092177 | 4/1988 |
| JP | 0392177 | 4/1988 |
| JP | 63-234679 | 9/1988 |
| JP | 10-042235 | 2/1989 |
| JP | 10-093933 | 4/1989 |
| JP | 01-307944 | 12/1989 |
| JP | 02-048879 | 2/1990 |
| JP | 03-022770 | 1/1991 |
| JP | 03-063990 | 3/1991 |
| JP | 04-079053 | 3/1992 |
| JP | 04227380 | 8/1992 |
| JP | 05-183826 | 7/1993 |
| JP | 05-260400 | 10/1993 |
| JP | 05-284437 | 10/1993 |
| JP | 05-314186 | 11/1993 |
| JP | 0621907 | 1/1994 |
| JP | 06-038165 | 2/1994 |
| JP | 06-124309 | 5/1994 |
| JP | 06-504165 | 5/1994 |
| JP | 61-024309 | 5/1994 |
| JP | 06-217271 | 8/1994 |
| JP | 06-243539 | 9/1994 |
| JP | 06-350546 | 12/1994 |
| JP | 07-021619 | 1/1995 |
| JP | 07-050259 | 2/1995 |
| JP | 07-076592 | 3/1995 |
| JP | 07-135621 | 5/1995 |
| JP | 07123326 | 5/1995 |
| JP | 07-154349 | 6/1995 |
| JP | 07-160732 | 6/1995 |
| JP | 07-162776 | 6/1995 |
| JP | 07147657 | 6/1995 |
| JP | 07-184131 | 7/1995 |
| JP | 07-193762 | 7/1995 |
| JP | 07-193763 | 7/1995 |
| JP | 07-212732 | 8/1995 |
| JP | 07-288759 | 10/1995 |
| JP | 0720254 | 11/1995 |
| JP | 07-321748 | 12/1995 |
| JP | 08-032528 | 2/1996 |
| JP | 08-056352 | 2/1996 |
| JP | 08032538 | 2/1996 |
| JP | 08125497 | 5/1996 |
| JP | 08-506941 | 7/1996 |
| JP | 08251122 | 9/1996 |
| JP | 08275077 | 10/1996 |
| JP | 09-009245 | 1/1997 |
| JP | 09-037151 | 2/1997 |
| JP | 09-037168 | 2/1997 |
| JP | 09-037172 | 2/1997 |
| JP | 09-070020 | 3/1997 |
| JP | 09-102827 | 4/1997 |
| JP | 09-162821 | 6/1997 |
| JP | 10-143340 | 5/1998 |
| JP | 10-143349 | 5/1998 |
| JP | 2001-213595 | 8/2001 |
| JP | 2002-279969 | 9/2002 |
| WO | WO-86/01359 A1 | 2/1986 |
| WO | WO 86/01962 | 3/1986 |
| WO | WO-87/03766 A1 | 6/1987 |
| WO | WO 88/04057 | 6/1988 |
| WO | WO 88/04507 | 6/1988 |
| WO | WO 89/02682 | 3/1989 |
| WO | WO-89/03085 A1 | 4/1989 |
| WO | WO 89/12370 | 12/1989 |
| WO | WO 90/01243 | 2/1990 |
| WO | WO 90/15507 | 12/1990 |
| WO | WO 91/00670 | 1/1991 |
| WO | WO 91/18476 | 11/1991 |
| WO | WO 92/04801 | 3/1992 |
| WO | WO 93/04473 | 3/1993 |
| WO | WO 93/05452 | 3/1993 |
| WO | WO 93/11638 | 6/1993 |
| WO | WO 93/11639 | 6/1993 |
| WO | WO 93/11640 | 6/1993 |
| WO | WO 93/23957 | 11/1993 |
| WO | WO 94/14281 | 6/1994 |
| WO | WO 94/14282 | 6/1994 |
| WO | WO 94/14283 | 6/1994 |
| WO | WO-94/14284 A1 | 6/1994 |
| WO | WO-9413107 A1 | 6/1994 |
| WO | WO 94/15284 | 7/1994 |
| WO | WO 94/21085 | 9/1994 |
| WO | WO 94/23383 | 10/1994 |
| WO | WO 94/29811 | 12/1994 |
| WO | WO-95/01056 A1 | 1/1995 |
| WO | WO-95/01059 A1 | 1/1995 |
| WO | WO 95/02945 | 1/1995 |
| WO | WO 95/06389 | 3/1995 |
| WO | WO 95/07003 | 3/1995 |
| WO | WO-95/10910 A2 | 4/1995 |
| WO | WO 95/15649 | 6/1995 |
| WO | WO-95/15658 A1 | 6/1995 |
| WO | WO 95/16568 | 6/1995 |
| WO | WO-9515657 A1 | 6/1995 |
| WO | WO-95/19092 A1 | 7/1995 |
| WO | WO 95/26095 | 9/1995 |
| WO | WO-95/26608 A1 | 10/1995 |
| WO | WO-95/28055 A1 | 10/1995 |
| WO | WO-95/28799 A1 | 10/1995 |
| WO | WO 95/30961 | 11/1995 |
| WO | WO 95/31069 | 11/1995 |
| WO | WO-95/32585 | 11/1995 |
| WO | WO-9532583 A1 | 11/1995 |
| WO | WO-95/33338 A1 | 12/1995 |
| WO | WO-96/07270 | 3/1996 |
| WO | WO 96/08109 | 3/1996 |
| WO | WO 96/08113 | 3/1996 |
| WO | WO-96/09721 | 3/1996 |
| WO | WO 96/13013 | 5/1996 |
| WO | WO-96/13932 | 5/1996 |
| WO | WO 96/13935 | 5/1996 |
| WO | WO-96/17467 A2 | 6/1996 |
| WO | WO-9617473 A1 | 6/1996 |
| WO | WO 96/21990 | 7/1996 |
| WO | WO 96/26605 | 8/1996 |
| WO | WO 96/27270 | 9/1996 |

(56) References Cited

FOREIGN PATENT DOCUMENTS

| | | |
|---|---|---|
| WO | WO 96/27982 | 9/1996 |
| WO | WO 96/27989 | 9/1996 |
| WO | WO 96/34467 | 10/1996 |
| WO | WO-96/37966 A1 | 11/1996 |
| WO | WO 96/37983 | 11/1996 |
| WO | WO 96/37996 | 11/1996 |
| WO | WO 96/38799 | 12/1996 |
| WO | WO 96/38962 | 12/1996 |
| WO | WO 96/41477 | 12/1996 |
| WO | WO-96/41478 | 12/1996 |
| WO | WO 97/02702 | 1/1997 |
| WO | WO 97/04595 | 2/1997 |
| WO | WO 97/07656 | 3/1997 |
| WO | WO 97/17774 | 5/1997 |
| WO | WO 97/18675 | 5/1997 |
| WO | WO 97/26612 | 7/1997 |
| WO | WO 97/31480 | 8/1997 |
| WO | WO 97/36422 | 10/1997 |
| WO | WO 97/41673 | 11/1997 |
| WO | WO 97/45786 | 12/1997 |
| WO | WO 97/47106 | 12/1997 |
| WO | WO 97/47143 | 12/1997 |
| WO | WO 97/48228 | 12/1997 |
| WO | WO-97/48230 | 12/1997 |
| WO | WO 97/49241 | 12/1997 |
| WO | WO-97/49242 | 12/1997 |
| WO | WO-97/50251 | 12/1997 |
| WO | WO 99/04561 | 1/1998 |
| WO | WO 98/06219 | 2/1998 |
| WO | WO-98/10589 | 3/1998 |
| WO | WO 98/17063 | 4/1998 |
| WO | WO-98/17064 A1 | 4/1998 |
| WO | WO 98/20675 | 5/1998 |
| WO | WO 98/21664 | 5/1998 |
| WO | WO 98/21877 | 5/1998 |
| WO | WO 98/26569 | 6/1998 |
| WO | WO-98/26584 | 6/1998 |
| WO | WO 98/27723 | 6/1998 |
| WO | WO 98/28906 | 7/1998 |
| WO | WO 98/31148 | 7/1998 |
| WO | WO 98/41020 | 9/1998 |
| WO | WO-98/43183 | 10/1998 |
| WO | WO 98/47279 | 10/1998 |
| WO | WO-98/48566 A2 | 10/1998 |
| WO | WO 98/56172 | 12/1998 |
| WO | WO 98/56173 | 12/1998 |
| WO | WO 98/56176 | 12/1998 |
| WO | WO-99/01984 A1 | 1/1999 |
| WO | WO 99/04570 | 1/1999 |
| WO | WO 99/07142 | 2/1999 |
| WO | WO-99/14947 | 3/1999 |
| WO | WO 99/18722 | 4/1999 |
| WO | WO 99/29109 | 6/1999 |
| WO | WO-99/30491 | 6/1999 |
| WO | WO 99/31480 | 6/1999 |
| WO | WO-99/40506 A1 | 8/1999 |
| WO | WO 99/45700 | 9/1999 |
| WO | WO-99/45701 A1 | 9/1999 |
| WO | WO-99/45702 | 9/1999 |
| WO | WO 99/52285 | 10/1999 |
| WO | WO 99/56466 | 11/1999 |
| WO | WO 99/56473 | 11/1999 |
| WO | WO 99/60789 | 11/1999 |
| WO | WO-00/04708 A1 | 1/2000 |
| WO | WO 2000/04706 | 1/2000 |
| WO | WO-00/10327 A1 | 2/2000 |
| WO | WO-0005889 A1 | 2/2000 |
| WO | WO-00/13415 A2 | 3/2000 |
| WO | WO 2000/11865 | 3/2000 |
| WO | WO 2000/16548 | 3/2000 |
| WO | WO 2000/27122 | 5/2000 |
| WO | WO-0028734 A1 | 5/2000 |
| WO | WO-00/33573 A1 | 6/2000 |
| WO | WO 2000/33160 | 6/2000 |
| WO | WO 2000/33224 | 6/2000 |
| WO | WO 2000/33560 | 6/2000 |
| WO | WO 2000/49801 | 8/2000 |
| WO | WO-01/01677 A1 | 1/2001 |
| WO | WO 2001/06784 | 1/2001 |
| WO | WO 2001/15438 | 3/2001 |
| WO | WO 2001/35662 | 5/2001 |
| WO | WO 2001/89213 | 11/2001 |
| WO | WO 2002/31731 | 4/2002 |
| WO | WO 2002/84992 | 10/2002 |
| WO | WO 2005/027512 | 3/2005 |
| WO | WO-98/16062 | 6/2007 |

OTHER PUBLICATIONS

"A Financial Times Survey: Viewdata (Advertisement)," Financial Times, Mar. 20, 1979.
"A Wonderworld of Services," The Sunday Times, Innovation section, p. 4, Jan. 7, 1996.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Columbia House CD-ROM Direct: Detail Page," accessed from the internet at http:--web.archive.org-web-19961221160255-http:--www.columbiahouse.com-cd-cgis . . . , copyright 1996, printed on Sep. 19, 2013.
"Columbia House CD-ROM Direct: Download Demos!," accessed from the internet at http:--web.archive.org-web-19961221095819-http:--www.columbiahouse.com-cd-cgis . . . , copyright 1996, printed on Sep. 19, 2013.
"Columbia House CD-ROM Direct: Member Center," accessed from the internet at http:--web.archive.org-web-19961221085905-http:--www.columbiahouse.com-repl-cd- . . . , copyright 1996, printed on Sep. 19, 2013.
"Columbia House CD-ROM Direct: Member Center," copyright 1996.
"Columbia House CD-ROM Direct: The Connection," accessed from the internet at http:--web.archive.org-web-19961221100721-http:--www.columbiahouse.com-repl-cd- . . . , copyright 1996, printed on Sep. 20, 2013.
"Columbia House CD-ROM Direct: The Connection," accessed from the internet at http:--web.archive.org-web-19961223152924-http:--www.columbiahouse.com-repl-cd- . . . , copyright 1996, printed on Sep. 20, 2013.
"Columbia House Laser Disc Club: FAQ Answers," accessed from the internet at http:--web.archive.org-web-19961223165516-http:--www.columbiahouse.com-repl-lc-t . . . , copyright 1996, printed on Sep. 20, 2013.
"Columbia House Laser Disc Club: Join the Club," accessed from the internet at http:--web.archive.org-web-19961221094037-http:--www.columbiahouse.com-repl-lc-t . . . , copyright 1996, printed on Sep. 20, 2013.
"Columbia House Music Club: Join the Club," accessed from the internet at http:--web.archive.org-web-19961221091101-http:--www.columbiahouse.com-repl-mc . . . , copyright 1996, printed on Sep. 20, 2013.
"Columbia House Music Club: Search," accessed from the internet at http:--web.archive.org-web-19961221114653-http:--www.columbiahouse.com-repl-mc . . . , copyright 1996, printed on Sep. 19, 2013.
"Columbia House Music Club: Shopping Cart," accessed from the internet at http:--web.archive.org-web-19961221120941-http:--www.columbiahouse.com-mc-cgis . . . , copyright 1996, printed on Sep. 19, 2013.
"Columbia House Video Club: Essential Collection," accessed from the internet at http:--web.archive.org-web-199612211131908-http:--www.columbiahouse.com-vc-cgis-j . . . , copyright 1996, printed on Sep. 20, 2013.
"Computer Network: Current Status and Outlook on Leading Science and Technology," Bureau of Science & Technology (Japan), vol. 1, Dec. 1986.

(56) References Cited

OTHER PUBLICATIONS

"Creation-Modification of the Audio Signal Processor Setup for a PC Audio Editor," IBM Technical Disclosure Bulletin, vol. 30, No. 10, Mar. 1988, pp. 367-376.
"D2B-Home Bus Fur Audio and Video," Selektor, Apr. 1990, pp. 10, 12. (English langauge translation attached.).
"Description of Digital Audio-Visual Functionalities (Tehcnical Report)," Digital Audio-Visual Council (DAVIC), 1.3.1 Par 1,:1998.
"Dialing the printed page," ITT in Europe Profile, 11—Spring 1977.
"Digital Video Broadcasting (DVB); DVB specification for data broadcasting," European Telecommunication Standards Institute, Draft EN 301 192 V1.2.1 (Jan. 1999).
"DIRECTV PlusL System", Thompson Consumer Electronics, Inc. (1999).
"Does NBC Get It," Aug. 14, 1995, retrieved from the internet at http:--www.open4success.org-db-bin19-019687.html, retrieved on Dec. 11, 2013.
"Duck Tales,'(1987)[TV Series 1987-1990]," Internet Movie Database (IMDB) [Retrieved on Apr. 7, 2007].
"Electronic Program Guide via Internet," Research Disclosure 276, Kenneth Mason Publications, Hampshire, GB, vol. 385, No. 2, May 1, 1996, ISSN: 0374-4353.
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http:--www.atvef.com-library-spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994, ETS 300 468.
"Facsimile Transmission," NHK Research Monthly Report, Dec. 1987(Unknown author).
"GameSpot: Allied General—Download It Now!!!!," accessed from the internet at http:--web.archive.org-web-19970206133452-http:--www.gamespot.com-strategy-allie . . . , copyright 1997, printed on Sep. 19, 2013.
"GameSpot: Allied General at a Glance," accessed from the internet at http:--web.archive.org-web-19970205153530-http:--www.gamespot.com-strategy-allie . . . , copyright 1996, printed on Sep. 19, 2013.
"GameSpot's Downloads for Allied General," accessed from the internet at http:--web.archive.org-web-19970205060703-http:--www.gamespot.com-strategy-allie . . . , copyright 1997, printed on Sep. 19, 2013.
"Gateway Destination: The PC for the Office and the Family Room," PC Magazine, First Looks section, pp. 39-41, Jun. 11, 1996.
"Getting Started" Installation Guide, "Using StarSight 1" Manual, and Remote Control "Quick Reference Guide."
"Growing U.S. interest in the impact of viewdata," Computing Weekly, Jul. 20, 1978.
"Hobbes' Internet Timeline 10.2," by Robert H'obbes' Zakon, from the internet at http://www.zakon.org/robert/internet/timeline/, printed from the internet on Sep. 13, 2012.
"Honey, is there anything good on the remote tonight?", advertisement from Multichannel News, Broadband Week Section, p. 168, Nov. 30, 1998.
"How Evolve Works," from the Internet at http:-- www.evolveproducts.com-network.html, printed on Dec. 28, 1998.
"Interactive Computer Conference Server," IBM Technical Bulletin, vol. 34, No. 7A, Dec. 1991, pp. 375-377.
"Interface Device for Conventional TVs to Improve Functionality", IBM Technical Disclosure Bulletin, vol. 36, No. 7, Jul. 1993, pp. 53-54.
"Internet User Forecast by Country," Computer Industry Almanac—Press Release, from the internet at http://www.c-i-a.com/internetusersexec.html, printed from the internet on Sep. 13, 2012.
"LISTS> What's on Tonite TV Listings" Internet Article, [Online], Jan. 28, 1995, XP002378869 Retrieved from the Internet: URL: www.scout.wisc.edu/Projects/PastProjects/NH/95-01-31/0018. html> [retrieved on Apr. 28, 2006] "the whole document".
"MSI Datacasting Systems," TV Communications Journal, Jan. 1973.
"Neue, Digitale Strategien Bericht Von Den 5. Dermastaedter Fernsehtagen," FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947. (Concise explanation included in IDS letter.).
"Open TV Launches OpenStreamer™ Technology for Broadcasters to Deliver First Ever Real-Time Digital Interactive Television," from the internet at http:--www.opentv.com-news-openstreamer_press_final.htm, printed on Jun. 28, 1999, the document bears a copyright date of 1999.
"Prevue Networks and OpenTV(R) Agree to Work Together on Deploying Interactive Program Guides Worldwide," from the internet at http:--www.opentv.com-news-prevuefinal.htm, printed on Jun. 28, 1999.
"Probe XL Brochure, Auto Tote Systems Inc.," (Newark, Delaware) (undated) 57 pgs.
"Prodigy Launches Interactive TV Listing," Apr. 22, 1994, Public Broadcasting Report.
"Reaching your subscribers is a complex and costly process-until now," from the Internet at http:--www.evolveproducts.com-info.html, printed on Dec. 28, 1998.
"Rewind, reply and unwind with new high-tech TV devices," by Lawrence J. Magid, LA Times. This document was printed from the internet on Jun. 6, 1999 and bears a date of May 19, 1999.
"Step Up to the Superhighway," The Sunday Times, Innovation section, p. 6, Jan. 7, 1996.
"Sun's Next Steps in Digital Set-Tops," article in Cablevision, p. 56, Nov. 16, 1998.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
"The Columbia House Video Club: Download Software," accessed from the internet at http:--web.archive.org-web-19961223163101-http:--www.columbiahouse.com-repl-vc . . . , copyright 1996, printed on Sep. 19, 2013.
"The Evolve EZ Guide. The Remote Control," from the Internet at http:--www.evolveproducts.com-display2.html, printed on Dec. 28, 1998.
"The New Media and Broadcast Policy: An Investigation & Research Conference Report on Broadcasting Diversification," Radio Regulatory Bureau, Japan Ministry of Posts & Telecommunications, Mar. 1982.
"Three men on a Viewdata bike," The Economist, Mar. 25, 1978.
"Today's Stop: What's On Tonite," Oct. 3, 1995, retrieved from the internet at http:--internettourbus.com-arch-1995-TB100395.TXT, retrieved on Dec. 9, 2013.
"TV Guide movie database" Internet web pages printed on Aug. 12, 1999 (9 pages).
"TV Guide Online Set for Fall," Entertainment Marketing Letter, Aug. 1994.
"TV Listings Functional Spec.," Time Video Information Services, Inc., undated.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.
"Viewdata and its potential impact in the USA: Final Report—Volume One, The UK Experience," Link and Butler Cox & Partners Limited, Oct. 1978.
"Viewdata moves in U.S. but GEC may lose out," Computing Weekly, Jan. 25, 1978.
"Viewdata Service Terminal Specification," British Post Office, Issue 5, Aug. 1978.

(56) References Cited

OTHER PUBLICATIONS

"Web TV and Its Consumer Electronics Licensees Debut First Internet Television Network and Set-Top Box," Jul. 10, 1996 <http:--www.ohlfs.com-keith-self-webtv-home-HTML-home.license.html>.
"Welcome to Columbia House Online," accessed from the internet at http:--web.archive.org-web-19961221085121-http:--www.columbiahouse.com-, copyright 1996, printed on Sep. 19, 2013.
"What is Jini?", from the Internet at http:--java.sun.com-products-jini-whitepapers-whatsjini.pdf, printed on Jan. 25, 1999.
"What's on Tonite!," Jan. 28, 1995, retrieved from the internet at http:--www.library.georgetown.edu-newjour-publication-whats-tonite-tm, retrieved on Dec. 11, 2013.
"Why Jini Now?", from the internet at http:--java.sun.com-products-jini-whitepapers-whyjininow.pdf, printed on Jan. 25, 1999. The document bears a copyright date of 1998.
"Windows 98 Feature Combines TV, Terminal and the Internet," New York Times, Aug. 18, 1998.
"Yearling's Free Personalised TV Guide," from the internet at http:--www.yearling.com-, Dec. 30, 1996.
ACM Multimedia 93 Proceedings, "A Digital On-Demand Video Service Supporting Content-Based Queries," Little et al. pp. 427-436, Jul. 1993.
Advertisement for "TV Decisions," Cable Vision, Aug. 4, 1986.
Aho, Debra, New Delphi Ads Push Envelope: Starting Visuals From Upstart Agency Go Too Far for One Paper's Tastes, Advertising Age 0.0, May 30, 1994, p. 16, Abstract.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at p. 76.
Articles from PR Newswire (Jun. 5, 1997), PR Newswire, Jun. 5, 1997, 19 pages.
Bach, U. et al., "Multimedia TV Set, Part 1" Radio-Fernsehen Elektronik (RFE), 9-96, pp. 28, 30, 31. (English language translation attached.).
Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, Nov. 1979, pp. 765-771.
Bensch, U., "VPV Videotext Programs Videorecorder," IEEE Paper, Jun. 1988, pp. 788-792.
Berniker, "TV Guide going online," Broadcasting & Cable, pp. 49-52, Jun. 13, 1994.
Bestler, Caitlin "Flexible Data Structures and Interface Rituals for Rapid Development of OSD Applications," Proceedings from the Eleven Technical Sessions, 42nd Annual Convention and Exposition of the NCTA, San Francisco, CA Jun. 6-9, 1993, pp. 223-236. Jun. 6, 1993.
Blahut et al., "Interactive Television," Proceedings of the IEEE, Jul. 1995.
Boyd-Merritt, R., "Television wires two-way video," Electronic Engineering Times, Apr. 25, 1994.
Brochure, "A New Approach to Addressability," CableData, undated.
Brochure, "Westar and Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Brugliera, Vito, "Digital On-Screen Display: A New Technology for the Consumer Interface" (Jun. 1993).
Buchholz et al., "Revolution auf dem Bildschirm—Die neuen Medien Videotext und Bildschirmtext," Wilhelm Goldmann Verlag, Munich, Germany, copyright 1979, pp. 24-33 and 36-39. (Concise explanation included in IDS letter.).
Cable Computer User's Guide, Rev. 1, Dec. 1985 (Plaintiff's Exhibit 289).
CableData, Roseville Consumer Presentation, Mar. 1986.
Came, E.B., "The Wired Household," IEEE Spectrum, vol. 16 No. 10, Oct. 1979, pp. 61-66.
Case 4:11-cv-06591-PJH, Complaint for Declaratory Relief (plaintiff), dated Dec. 21, 2011, 16 pages.
Chan, Patrick P., "Learning Considerations in User Interface Design: The Room Model," Publication of the Software Portability Laboratory, University of Waterloo, Ontario, Canada, Jul. 1984.
Chang, Yee-Hsiang et al., "An Open-Systems Approach to Video on Demand," IEEE Communications Magazine, May 1994, pp. 68-80.
Chen et al., "Real Time Video and Audio in the World Wide Web," Proc. 4th World Wide Web Conference, 1995.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Cleland, Kim, Look Out MSN, Here Comes MCI, Advertising Age, vol. 66, No. 32, Aug. 14, 1995, p. 19.
Comdex—Mitsubishi Previews 40-Inch DiamondWeb TV, Newsbytes, Nov. 19, 1996, Abstract.
Compton et al., "Internet CNN Newsroom: a digital video news magazine and library," Proc. of the Intl. Conf. on Multimedia Computing and Systems. Washington, May 15-18, 1995; [Proceedings of the International Conference on Multimedia Computing and Systems], Los Alamitos, IEEE Comp. Soc. Press, US, May 15, 1995 (May 15, 1995), pp. 296-301, XP010154611.
Cool Websites: [2 Star Edition], Houston Chronicle, Houston, Texas, Jul. 11, 1996, p. 3, Abstract.
Cox, J. et al, "Extended Services in a Digital Compression System," Proceedings from Eleven Technical Sessions: 42nd Annual Convention and Exposition of the National Cable Television Association, Jun. 1993, pp. 185-191.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, N.G., "Teletext Decoders-Keeping Up With the Latest Advances," IEEE Transactions on Consumer Electronics, vol. CE-30, No. 3, Aug. 1984, pp. 429-435.
Davic 1.0 Specifications, Part 1, Description of DAVIC Functionalities, Revision 3.2, Digital Audio-Visual Council, Jul. 10, 1995, 61 pages.
Day, R., "The Great PC-TV Debate," OEM Magazine, Jul. 1, 1996.
December, "Presenting Java," Sams.net Publishing, published Sep. 20, 1995.
Declaration Under 37 C.F.R. § 1.132 of Richard E. Glassberg, signed Oct. 20, 2006, filed Oct. 24, 2006, from U.S. Appl. No. 10/346,266.
Defence and Counterclaim of the First and Second Defendants, No. HC11 C 04556, between Starsight Telecast and United Video Properties (Claimants) and Virgin Media, Virgin Media Payments, and TiVo Defendants, pp. 10-11, Mar. 14, 2012.
DIRECTV Receiver with TiVo: Digital Satellite Receiver/Recorder SAT-T60 Installation Guide, Sony Cooperation (2000).
DIRECTV Receiver with TiVo: Viewer's Guide, Sony Coorperation (2000).
DiRosa, S., "BIGSURF Netguide," Jul. 1995, vol. 3.1 (Sections 18,21, and 28-renumbered as pp. 1-27).
Dr. Dobb's, "Implementing a Web Shopping Cart," from the internet at https://www.drdobbs.com/article/print?articleId=184409959&siteSect . . . , Sep. 1, 1996, printed from the internet on Sep. 13, 2012.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.

(56) References Cited

OTHER PUBLICATIONS

Eckhoff, "TV Listing Star on the Computer," Central Penn Business Journal, High Beam Research, Mar. 15, 1996.
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukunftige Informations—Und Datenangebote Beim Digitalen Fernsehen—EPG Und "Lesezeichen"," Rundfunktechnische Mitteilungen, vol. 41, pp. 67-72, Jun. 1997.
European Search Report dated Nov. 19, 2002 from European Application No. 989446111.7.
Fry et al., "Delivering QoS Controlled Continuous Media on the World Wide Web," Proceedings of the 4th International IFIP Workshop on QoS, Paris, Mar. 6-8, 1996.
Garneau, Information Highway in Quebec, Editor & Publisher, vol. 127, No. 5, Jan. 29, 1994, 4 pages.
Goff, Leslie, Subs Find Lots of Program Guides Online, Multichannel News, vol. 17, No. 19, May 6, 1996, p. 38, Abstract.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75. (Concise explanation included in IDS letter.).
Hartwig, Rautenberg, Bollmann, "Broadcasting and Processing of Program Guides for Digital TV," SMPTE Journal, pp. 727-732, Oct. 1997.
Hauptmann et al., "News on Demand," News-on-Demand: An Application of Informedia® Technology D-Lib Magazine, Sep. 13, 1995, XP002675162, Retrieved from the Internet: URL:http:--www.dlib.org-dlib-september95-nod-page3.html [retrieved on May 2, 2012].
Hedger, J., "Telesoftware: Home Computing Via Broadcast Teletext," IEEE Transactions on Consumer Electronics, vol. CE-25, No. 3, Jul. 1979, pp. 279-287.
Hitachi Consumer Electronics Co., Ltd., Certification of market introduction in 1993 of Hitachi Projection TV Model 55EX7K.
Hitachi Projection Color TV Operating Guide, for Models 55EX7K, 50EX6K, 50ES1B-K, and 46EX3B-4K, undated.
Hitachi Service Manual, No. 0021, Projection Color Television, Models 55EX7K, 50EX6K, 50ES1B-K, 46EX3B-4K, and 46EX3BS-4KS, Aug. 1993.
Hoarty, W. Leo, "Multimedia on Cable Television Systems," Symposium Record Table TV Sessions, 18th International Television Symposium and Technical Exhibition, Montreux, Switzerland, Jun. 10, 1993, pp. 555-567.
Hobbes Internet Timeline, Mar. 22, 2007.
Hofmann, Neumann, Oberlies, and Schadwinkel, "Videotext Programmiert Videorecorder," Rundfunktechnische Mitteilungen, Nov.-Dec. 1982, pp. 254-257. (English language translation attached.).
Holland, G. L., "NAPLPS standard defines graphics and text communications," EDN, Jan. 10, 1985, at p. 179.
Iizuka et al., Building Internet TV Guide Service 1 and 2, the 53rd National Conference Proceedings, Japan, Information Processing Society of Japan, Sep. 6, 1996 p. 3-227 to 3-230. (Concise explanation included in IDS letter.).
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise explanation included in IDS letter.).
Instruction Manual Using StarSight 2, StarSight Telecast, Inc., 1994.
Instructional Manual, "Sonic the Hedgehog," Sega of America, 1992.
Irven, "Multi-Media Information Services: A Laboratory Study," IEEE Communications Magazine, vol. 26, No. 6, Jun. 1988, pp. 27-33 and 36-44.
Ishii, Hiroshi et al, "Clearface: Translucent Multiuser Interface for TeamWorkStation," ECSCW, Sep. 1991, pp. 6-10.
Ishii, Hiroshi et al, "Toward an Open Shared Workspace: Computer and Video Fusion Approach of Team Workstation," Communications of the ACM, Dec. 1991, vol. 34 No. 12, pp. 37-50.
James, A., "Oracle—Broadcasting the Written Word," Wireless World, Jul. 1973, vol. 79, No. 1453, pp. 314-316.
Judice, C.N., "Move Over Cable, Here Comes Video Via Voice Lines," Network World, Sep. 1986, p. 26.
JVC Service Manual, 27" Color Monitor-Receiver, Model AV-2771S (U.S.), Jul. 1991.
Kai et al., "Development of a Simulation System for Integrated Services Television", Report from Information Processing Society of Japan, Japan, Sep. 13, 1996, vol. 96, No. 90 p. 13-20.
Karstad, K., "Microprocessor Control for Color-TV Receivers," IEEE Transactions on Consumer Electronics, vol. CE-26, May 1980, pp. 149-155.
Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Keith Lynch's timeline of net related terms and concepts, Mar. 22, 2007.
Khoo et al., "An Expert System Approach to Online Catalog Subject Searching," Information Processing & Management: An International Journal, vol. 30, No. 2, 1994, pp. 223-238.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Large, P., "Throw away the books—Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich, Jim & Schein, Steve, *StarSight Interactive Television Program Guide, Phase 11/*, Functional/Interactional Architecture Specification Document, Orbit Interaction, Palo Alto, California.
Leftwich, Jim, Lai, Willy & Schein, Steve, *StarSight Interactive Television Program Guide, Phase IV*, Functional/Interactional Architecture Specification Document, Orbit Interaction, Palo Alto, California, published before Apr. 19, 1995.
Listing of computer code for operating system within the Cable Computer in 1985 (Plaintiff's Exhibit 298).
Listing of computer code for Video HTU Program (Plaintiff's Exhibit 299).
Little et al., "Prospects for Interactive Video-on-Demand," IEEE Multimedia, Fall 1994, pp. 14-24.
Lloyd, J., "Impact of technology," Financial Times, Jul. 1978.
Loen et al., "Subscriber Terminal Units for Video Dial Tone Systems," IEEE Network, Sep./Oct. 1995, pp. 48-57.
Lowenstein, R.L. and Aller, H.E., "The Inevitable March of Videotex," Technology Review, vol. 88, Oct. 1985, p. 22.
M-A-COM, Inc., "Videocipher II Satellite Descrambler Owner's Manual," dated Prior Feb. 1986, pp. 1-17.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Melton, "The Uniden Super 4800," OnSat magazine, Jun. 10-16, 1990, pp. 2-4.
Merrell, R.G., "Tac Timer," 1986 NCTA Technical Papers, pp. 203-206.
Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at p. 57.

(56) References Cited

OTHER PUBLICATIONS

Neumann, Andreas, "WDR Online Aufbau Und Perspektiven Automatisierter Online-Dienste 1m WDR," Rundfunktechnische Mitteilungen, vol. 41, pp. 56-66, Jun. 1997.
Okimi, Katsuya et al., "Shinban ISDN," ("New ISDN Edition"), Japan, Ohmsha, Ltd., First Edition, Oct. 5, 1995, pp. 261-285. (Concise Explanation included in IDS letter.).
Owen, K., "How dial-a-fact is coming closer to home," The Times, Sep. 30, 1977.
Owen, K., "Why the Post Office is so excited by its plans for a TV screen information service," The Times, Sep. 26, 1976.
Peddicord, Ross, "New on TV: You Bet Your Horse," The Sun, Baltimore Maryland Dec. 15, 1994, 1 pg.
Periodical Funkschau, vol. 11/1994, pp. 78-79: Dial M for Movie.
Periodical RFE, vol. 9'95, p. 100: Trend and Technology Open TV for Interactive Television.
Personal Entertainment Guide—User's Guide, Version 1.0, Copyright 1991 by Lookahead Communications Inc.
Pfister, Larry T., "Teletext: Its Time Has Come," Prepared for the IGC Videotext—Teletext Conference, Andover, Massachusetts, Dec. 14, 1982, pp. 1-11.
Poole, J., "Demand for Viewdata grows," Sunday Times, Feb. 10, 1977.
Prevue Channel Sep. 1, 1995 (part 1), PrevueGuide, from the internet at http://www.youtube.com/watch?v=OVul78nH6RY, retrieved on Nov. 26, 2013, 1 pg.
Prevue Guide Brochure, Spring 1984.
Prevue Guide Brochure, Spring 1994.
Prevue Online Debuts Local Listings for 250 Systems; System-Specific Listings Include Multimedia Features—Free Build Acceleration, PR Newswire, Jun. 5, 1997.
Prevue Online, Dec. 28, 1996, extract from web.archive.org, printed on Nov. 18, 2014, http://www.prevue.com.
Printout from Google News Archives, Mar. 22, 2007.
Qayyum, H., "Using IVDS and VBI for Interactive Television," IEEE, Jun. 10, 1996.
Rajapakshe et al., "Video on demand," (last modified Jun. 1995) <http:--www-dse.doc.ic.ac.uk-~nd-suprise_95-Journal-vol4-shr-report.html>.
Rath et al., "Set-Top Box Control Software: A Key Component in Digital Video," Philips Journal of Research, vol. 50, No. 1/2, 1996, at p. 185.
Rayers, D.J., "Telesoftware by Teletext," 1984 IEEE Conference Papers, vol. 240, p. 323.
Rogers, C., "Telcos vs. Cable TV: The Global View," Sep. 1995, Report/Alternative Carriers, Data Communications, No. 13, New York, pp. 75, 76, 78, 80.
Roizen, Joseph "Teletext in the USA," Society of Motion Picture and Television Engineers Journal, Jul. 1981, pp. 602-610.
Rosch, Gary D., "New data and information system set for commercial market trial," Telephony, Mar. 20, 1978, at p. 96.
Ruffler et al., "InfoRadio on Demand, WebTV and digiTaz—Telecommerce Case Studies," May 23, 1996.
Ryan, K., "Free Interactive TV Guide," Google Newsgroup, Alleged Date Sep. 29, 1995.
Ryan, M., "Interactive TV Takes a Corporate Twist," Electronic Engineering Times, Jul. 10, 1995.
Savage, "Internet's 'What's on Tonite!' Tells You Just That and More," The News, InfoWatch, May 29, 1995.
Schlender, B.R., "Couch Potatoes! Now It's Smart TV," Fortune, Nov. 20, 1989, pp. 111-116.
Schmuckler, Eric, "A marriage that's made in cyberspace (television networks pursue links with online information services)," May 16, 1994, Mediaweek, v4, n20, p22 (3).
Sealfon, Peggy, "High Tech TV," Photographic, Dec. 1984.
Selected pages from the "BBC Online—Schedules" web page. This web page is located at http:--www.bbc.co.uk-schedules- (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at p. 19.6-47.
Sorce et al., "Designing a Broadband Residential Entertainment Service: A Case Study," GTE Laboratories Incorporated, undated, pp. 141-148.
St. John, Sandringham, "Dress rehearsal for the PRESTEL show," New Scientist, Jun. 1, 1978, pp. 586-588.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," The Economist, Jun. 5, 1978.
Stokes, A., "The viewdata age: Power to the People," Computing Weekly, Jan. 1979.
Sunada, K. et al, "Teletext Color Television Receiver Model C-29M950, C26M940," NEC Home Electronics , NEC Giho, 1987.
SuperGuide-Uniden 4800, "A Quick Guide to Programming the Uniden 4800—Dealer Set-Up Manual," undated, 8 pages.
SuperGuide-Uniden 4800, "A User's Guide to SuperGuide's™ Features," undated, 12 pages.
Supplementary European Search Report for Application No. EP 98 93 5889, completed on Sep. 28, 2001.
Sussman, A. "GTE Tunes in to Home TV Shopping," PC Week, Jun. 28, 1988, p. C15.
Tech Notes: Product Updates from M-A-COM Cable Home Group, "Videocipher Owner's Manual Update," Issue No. 6, Feb. 1986.
Technical White Paper, "Open TV™ Operating Environment," (© 1998 OpenTV Inc.), pp. 1-12.
Teletext presents the alternative view, Financial Times, Oct. 24, 1977.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Thomas, "Electronic Program Guide Applications—The Basics of System Design," NCTA Technical Papers, 1994, pp. 15-20.
Tom Schauer: Internet Article, [Online] Sep. 28, 1995 (Sep. 28, 1995), XP002378870, Retrieved from the Internet: URL: www.vision2020.moscow.com/Archives/1995/9509/0058. htlm> [retrieved on Apr. 28, 2006] *the whole document*.
Transcript of the Deposition of John Roop, Oct. 1996, pp. 186-187.
Trial testimony of Michael Axford, *Prevue Interactive, Inc. and United Video Satellite Group, Inc. v. Starsight Telecast, Inc.*, May 9, 1998, pp. 186-187, 295-315, and 352-357.
TV Guide on Screen Prior Use Transcript of Proceedings, "Violence on Television," House of Representatives, Committee on Energy and Commerce, Subcommittee on Telecommunications and Finance, Jun. 25, 1993.
Ueda, Hirotada et al, "Impact: An Interactive Natural-Motion-Picture Dedicated Multi-Media Authoring System," Communications of the ACM, Mar. 1991, pp. 343-350.
Uniden®, UST-4800 Super, Integrated Receiver-Descrambler, Preliminary Reference Manual, Nov. 12, 1991, 80 pages.
Uniden®, UST-4800, Integrated Receiver-Descrambler, Installation Guide, copyright 1990, 60 pages.
Uniden®, UST-4800, Integrated Receiver-Descrambler, Operating Guide, copyright 1990, 24 pages.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, Videoguide User's Manual, pp. 1-27, undated.

(56) References Cited

OTHER PUBLICATIONS

Waldo, Jim, "JiniTM Architecture Overview," from the Internet at http:--Java.sun.com-products-jini-whitepapers-architectureoverview.pdf—printed on Jan. 25, 1999. The document bears a copyright date of 1998.

Whale, "Identification of Program Similarity in Large Populations," The Computer Journal, vol. 33, No. 2, 1990, pp. 140-146.

What's New @ Prevue Online—Real™ Video, May 2, 1997, extract from web.archive.org, printed on Nov. 18, 2014, http://www.prevue.com/scripts/whatsnew.asp.

Whitehorn, K., "Viewdata and you," Observer, Jul. 30, 1978.

Wikipedia article on CompuServe, Mar. 22, 2007.

Wikipedia article, "Geschichte des Internets," from the internet at http://de.wikipedia.org/wiki/Geschichte_des_Internets, page last modified on Apr. 28, 2012, printed from the internet on May 18, 2012. (Concise explanation included in IDS letter.).

Wikipedia article, "Internet Explorer," from the internet at http://de.wikipedia.org/wiki/Internet_Explorer, page last modified on Sep. 9, 2012, printed from the internet on Sep. 13, 2012. (Concise explanation included in IDS letter.).

Wikipedia article, "MSN TV," from the internet at http://en.wikipedia.org/wiki/MSN_TV, page last modified on May 15, 2012, printed from the internet on Sep. 13, 2012.

Wikipedia article, "NCSA Mosaic," from the internet at http://de.wikipedia.org/wiki/NCSA_Mosaic, page last modified on Sep. 3, 2012, printed from the internet on Sep. 13, 2012. (Concise explanation included in IDS letter.).

Wikipedia article, TVGN, from the internet at http://en.wikipedia.org/wiki/TVGN, page last modified on Nov. 17, 2014, printed from the internet on Nov. 18, 2014.

Wikipedia-Teletext Excerpt.

Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.

Wittig, H. et al.: "Intelligent Media Agents in Interactive Television Systems" Proceedings of the International Conference on Multimedia Computing and Systems, Los Alamitos, CA, US, May 15, 1995 (May 15, 1995),-May 18, 1995, (May 18, 1995) pp. 182-189, XP00603484 p. 183, left hand column, paragraph 2, p. 184, right-hand column, paragraph 2 figure 4.

Wolfe, Alexander, Beyond the SIPC, Electronic Engineering Times, No. 910, Jul. 15, 1996, p. 41, Abstract.

Wolfe, Alexander, Microsoft Poses PC Specs., Electronic Engineering Times, Jul. 8, 1996, Abstract.

Yarrow, The Media Business; Pay-Per-View Television is Ready for Takeoff, The New York Times, Archives, Nov. 14, 1988, 3 pages.

Yoshida, J., "Interactive TV a Blur," Electronic Engineering Times, Jan. 30, 1995.

\* cited by examiner

1300

| ☐ My Favorites | Favorites List — 1314 | Previously Watched — 1322 | Recommended — 1316 1318 | Coming up today |
| --- | --- | --- | --- | --- |
| | | 1302 | 1320 | Coming up this week |
| | | | | 12:00 |

These programs are about to start

| Thursday | △ 1304 12:00 pm | 12:30 pm 1306 |
| --- | --- | --- |
| KOKI | 25 | Simpsons ▲ Simpsons |
| KTUL | 35 | Friends △ Friends |
| | △ 1310 | 1308 |

You may also like these

| KFOG | 66 | King of the Hill |
| --- | --- | --- |
| | | △ 1312 |

FIG. 13

| Program Guide | | | |
|---|---|---|---|
| Thursday ▽ | 12:00 pm | 12:30 pm | △ 12:00 |
| ESPN 22 | NBA Basketball | | |
| TNN 23 | Miami Vice | Miami Vice | |
| ⋮ | | | |

1602

1600

These favorites are available in this time frame

| Thursday ▽ | 12:00 | 12:30 | △ |
|---|---|---|---|
| KOKI 25 | Simpsons | | |
| KTUL 35 | Friends | Friends | |

These suggested programs are available in this time frame

| KFOG 66 | King of the Hill | | |
|---|---|---|---|

Close — 1604

FIG. 16

SYSTEMS AND METHODS FOR PROVIDING PROGRAM SUGGESTIONS IN AN INTERACTIVE TELEVISION PROGRAM GUIDE

CROSS-REFERENCE TO RELATED APPLICATIONS

This application is a continuation of U.S. patent application Ser. No. 14/941,981, filed Nov. 16, 2015 (currently allowed), which is a continuation of U.S. patent application Ser. No. 14/557,077, filed Dec. 1, 2014 (now U.S. Pat. No. 9,191,719), which is a continuation of U.S. patent application Ser. No. 13/165,209, filed Jun. 21, 2011 (now U.S. Pat. No. 8,904,441), which is a continuation of U.S. patent application Ser. No. 10/703,989, filed Nov. 6, 2003 (now U.S. Pat. No. 7,984,468), each of which is herein incorporated by reference in its entirety, respectively.

BACKGROUND OF THE INVENTION

This invention relates to television systems, and more particularly, this invention relates to interactive television systems such as interactive television program guide systems that suggest television programs to a user.

Cable, satellite, and broadcast television systems provide users with a large number of television channels. Users have traditionally consulted printed television program schedules to determine the programs being broadcasted at a particular time. As the number of available programs has increased, various television program guides, such as interactive television program guides, have been developed to help users select television programs of interest.

In some known systems, an interactive television program guide application allows a user to supply selection criteria which are used by the interactive television program guide application to select television programs that are of interest to the user. The selected television programs may be, for example, displayed for the user, recorded on a personal video recorder, or added to the user's favorite list. Interactive television program guide applications that select television programs for a user based on user-defined selection criteria are described, for example, in U.S. Pat. Nos. 4,706,121, 5,353,121, and 6,133,909.

Usually, the user of such known systems is required to specify a list of selection criteria and request a search based on the criteria to enable the interactive television program guide application to select television programs that are potentially of interest to the user. Such a process for providing a user with recommended programming can be tedious. Furthermore, some users may not even be aware that an option exists to allow specification of such selection criteria.

Accordingly, it would be desirable to provide an interactive television program guide application that automatically queries a user regarding the user's interest in various television programs to assist the user in selecting future television programs of interest.

SUMMARY OF THE INVENTION

In accordance with the present invention, an interactive television program guide application is provided that automatically queries a user regarding the user's interest in various television programs. The interactive television program guide application uses the user's responses to suggest to the user television programs that are potentially of interest.

In some embodiments of the present invention, the interactive television program guide application may monitor the user's television viewing pattern to identify a television program that is potentially of interest to the user. For example, the interactive television program guide application may determine that the user's viewing pattern associated with a television program satisfies one or more predetermined criteria for identifying potential television programs of interest (e.g., the user has continuously watched the television program for a time period that is greater than a predetermined time period). In making such a determination, the interactive television program guide application may mark the television program as a potential television program of interest.

The interactive television program guide application may then query the user using questions that are formulated based on attributes associated with the identified potential television program of interest. For example, the interactive television program guide application may determine from an attribute associated with the television program that the program is a movie having a sequel. In response to making this determination, the interactive television program guide application may formulate a question to prompt the user to set a reminder for the sequel.

Using the user's responses to the various questions, the interactive television program guide application may identify one or more television programs to suggest to the user.

Further features of the invention, its nature and various advantages will be more apparent from the accompanying drawings and the following detailed description of the preferred embodiments.

BRIEF DESCRIPTION OF THE DRAWINGS

FIG. 13 shows an illustrative favorites screen in accordance with the present invention.

FIG. 16 shows an illustrative interactive television program guide screen containing a suggestion overlay in accordance with the present invention.

DETAILED DESCRIPTION OF THE PREFERRED EMBODIMENTS

Figure 1:
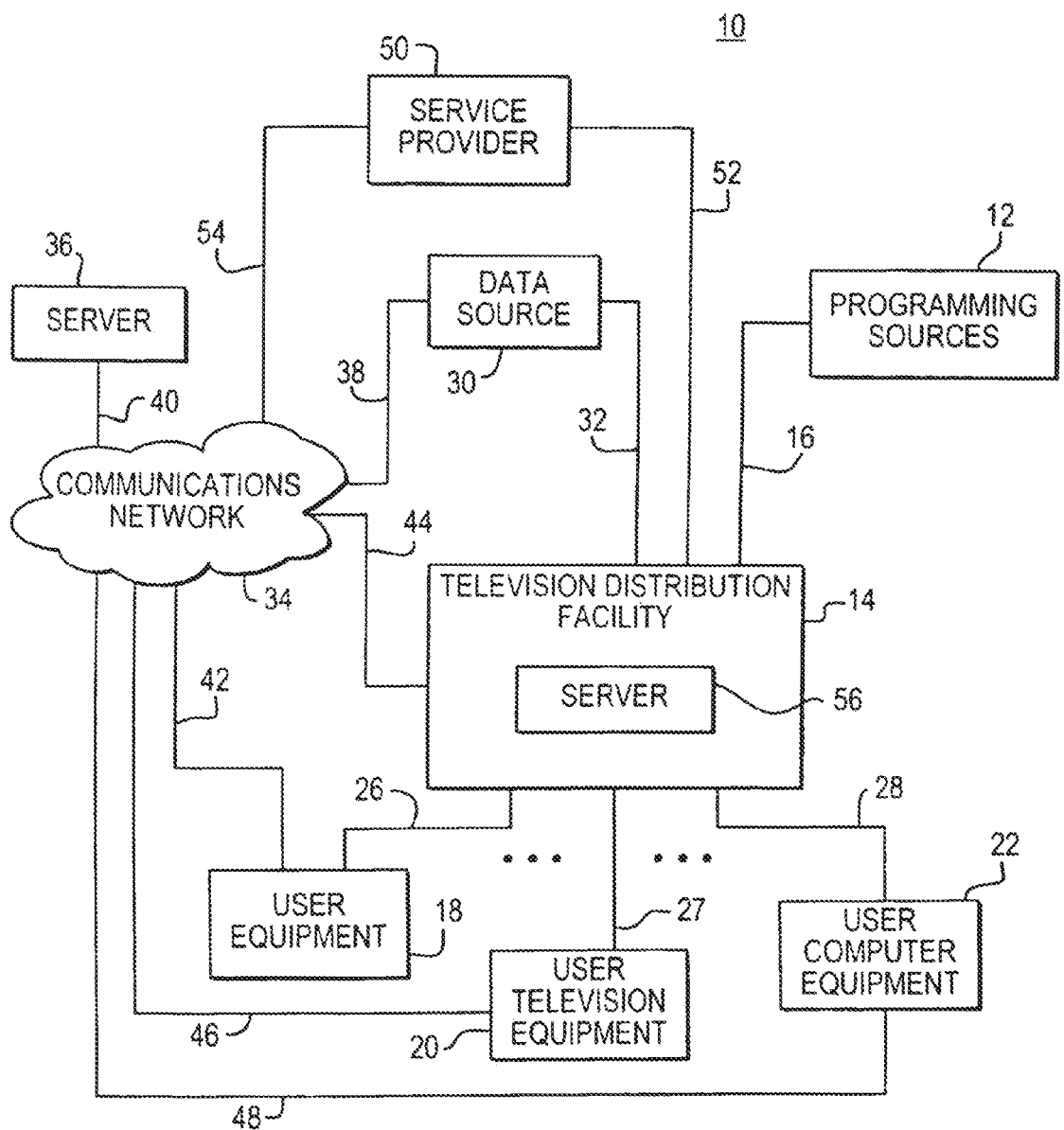
FIG. 1 is a diagram of an illustrative interactive television system in accordance with the present invention.

An illustrative interactive television system 10 in accordance with the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, or any other suitable source of programming.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

User equipment 18 may receive television and music programming and other information from television distribution facility 14 over communications paths such as communications paths 26, 27, and 28. User equipment 18 may also transmit signals to television distribution facility 14 over paths 26, 27, and 28. Paths 26, 27, and 28 may be cables or other wired connections, free-space connections (e.g., for broadcast or other wireless signals), satellite links, or any other suitable communications link.

Any suitable communications scheme may be used to transmit data over paths 26, 27, and 28, including in-band transmissions, out-of-band transmissions, digital transmissions, analog transmissions, cable transmissions, satellite transmissions, cable modem transmissions, over-the-air transmissions, multichannel multipoint distribution services (MMDS) transmissions, or any other suitable communication scheme.

If desired, interactive television program guide application data may be distributed over an out-of-band channel on paths 26, 27, and 28 or over an in-band path such as the vertical blanking interval (VBI). Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels or data streams on paths 26, 27, and 28. Such digital channels or data streams may also be used for distributing text and graphics.

Data source 30 may include a program listings database that is used to provide the user with television program schedule information such as scheduled broadcast times, titles, channels, ratings information (e.g., parental ratings and critic's ratings), detailed title descriptions, genre or category information (e.g., sports, news, movies, etc.), information on actors and actresses, running times, or any other suitable information. Data source 30 may also be used to provide advertisements (e.g., program guide advertisements and advertisements for other interactive television applications), real-time data such as sports scores, stock quotes, news, weather, or any other suitable data. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, any other suitable communications path, or a combination of such paths. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on digital music for the user. An interactive television program guide application or other suitable application may be used to display such information on the user's display.

The present invention is primarily discussed herein in the context of the interactive television program guide application. The interactive television program guide application may include any suitable software, hardware, or both used to implement the features of the present invention.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, or any other suitable communications path. Communications network 34 may be any suitable communications network, such as the Internet, the public switched telephone network, a packet-based network, or any other suitable communications network.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, any other suitable communications path, or a combination of such paths.

User equipment 18, which may include user television equipment 20 and user computer equipment 22, may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, any other suitable communications path, or a combination of such paths.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using user equipment 18 may be used to access the service provider to provide these features to the user. User equipment 18 may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, any other suitable communications path, or a combination of such paths.

Another example of an interactive television application is a home banking application. A home banking service may be supported using personnel at facilities such as service provider 50. An interactive home banking application that is implemented using user equipment 18 may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to user equipment 18 when requested by users. An interactive television application may be used to support the functions of a personal video recorder (sometimes called a digital video recorder) that is implemented using user equipment 18. Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television program guide application, a home shopping application, a home banking application, a video-on-demand application, game applications, and other applications (e.g., applications related to e-mail and chat or other communications functions) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television program guide application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on user equipment 18. The applications may also be implemented in a distributed fashion (e.g., using a client-server architecture in which user equipment 18 serves at least partly and for at least some of the time, as the client and a server such as server 56 at television distribution facility 14, server 36, or other suitable equipment acts as the server). Other distributed architectures may also be used if desired. Some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, or any other suitable application program, the software that supports these features may be referred to as an application or applications.

Figure 2:
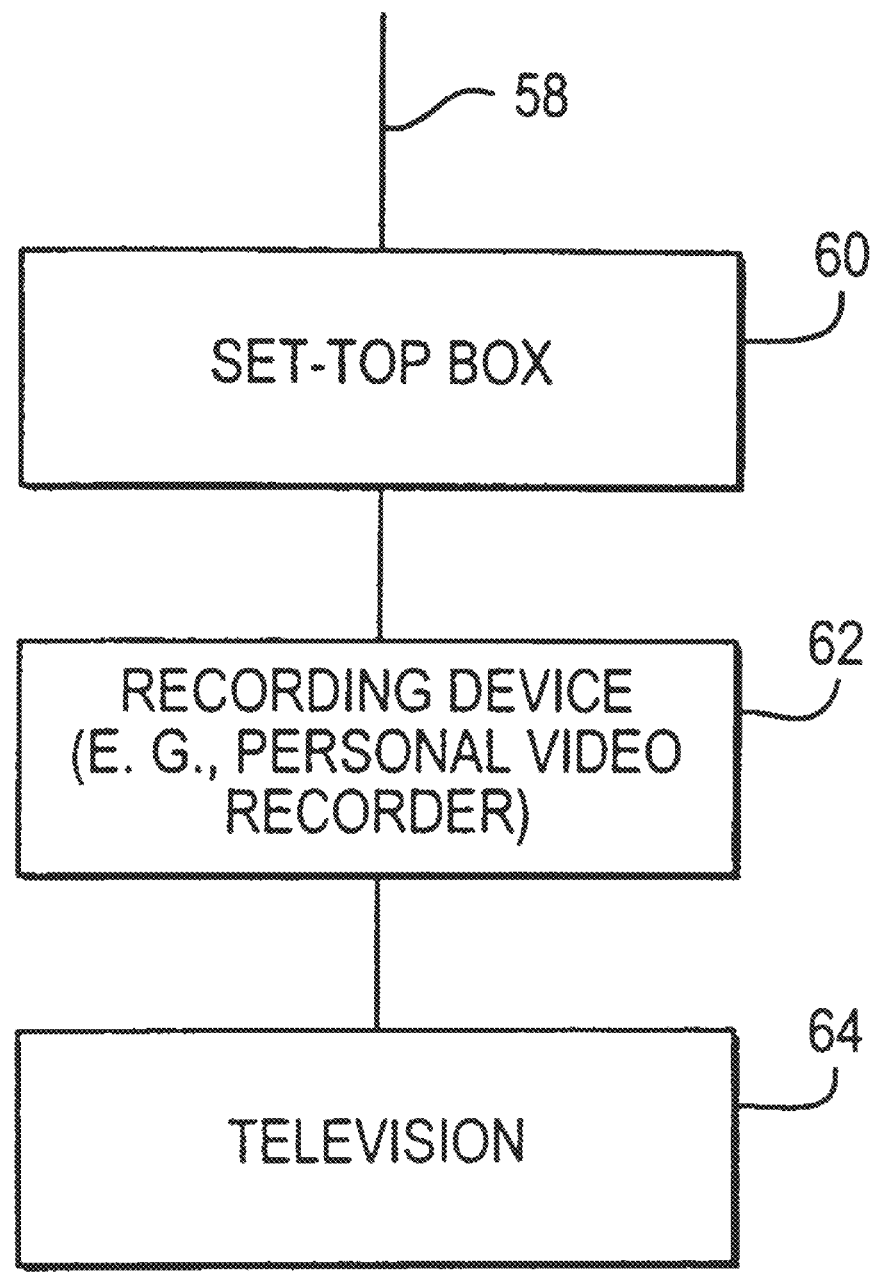
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may be any suitable analog or digital set-top box (e.g., a cable set-top box). Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, wireless modem, or any other suitable communications circuitry, for communications with other equipment. Such communications may involve the Internet or any other suitable communications networks or paths. If desired, the components of set-top box 60 may be integrated into other user equipment (e.g., a television or videocassette recorder).

Recording device 62 may be used to record videos provided by set-top box 60. For example, if set-top box 60 is tuned to a given television channel, the video signal for that television channel may be passed to recording device 62 for recording on a videocassette, compact disc, digital video disk, or internal hard drive or other storage device. Recording device 62 may have communications circuitry such as a cable modem, an ISDN modem, a DSL modem, a telephone modem, or any other suitable communications circuitry, for communications with other equipment. Such communications may involve the Internet or any other suitable communications networks or paths. The components of recording device 62 may be integrated into other user equipment (e.g., a television, stereo equipment, or any other suitable user equipment).

Recording device 62 may be controlled using a remote control or other suitable user interface. If desired, video recorder functions such as start, stop, record, etc. and other functions for device 62 may be controlled by set-top box 60. For example, set-top box 60 may control recording device 62 using infrared commands directed toward the remote control inputs of recording device 62 or set-top box 60 may control recording device 62 using other wired or wireless communications paths between box 60 and device 62.

The output of recording device 62 may be provided to television 64 for display to the user. If desired, multiple recording devices 62 or no recording device 62 may be used. If recording device 62 is not present or is not being actively used, the video signals from set-top box 60 may be provided directly to television 64. Any suitable television or monitor may be used to display the video. In the equipment of FIG. 2 and the other equipment of system 10, the audio associated with various video items is typically distributed with those video items and is generally played back to the user as the videos are played.

Figure 3:
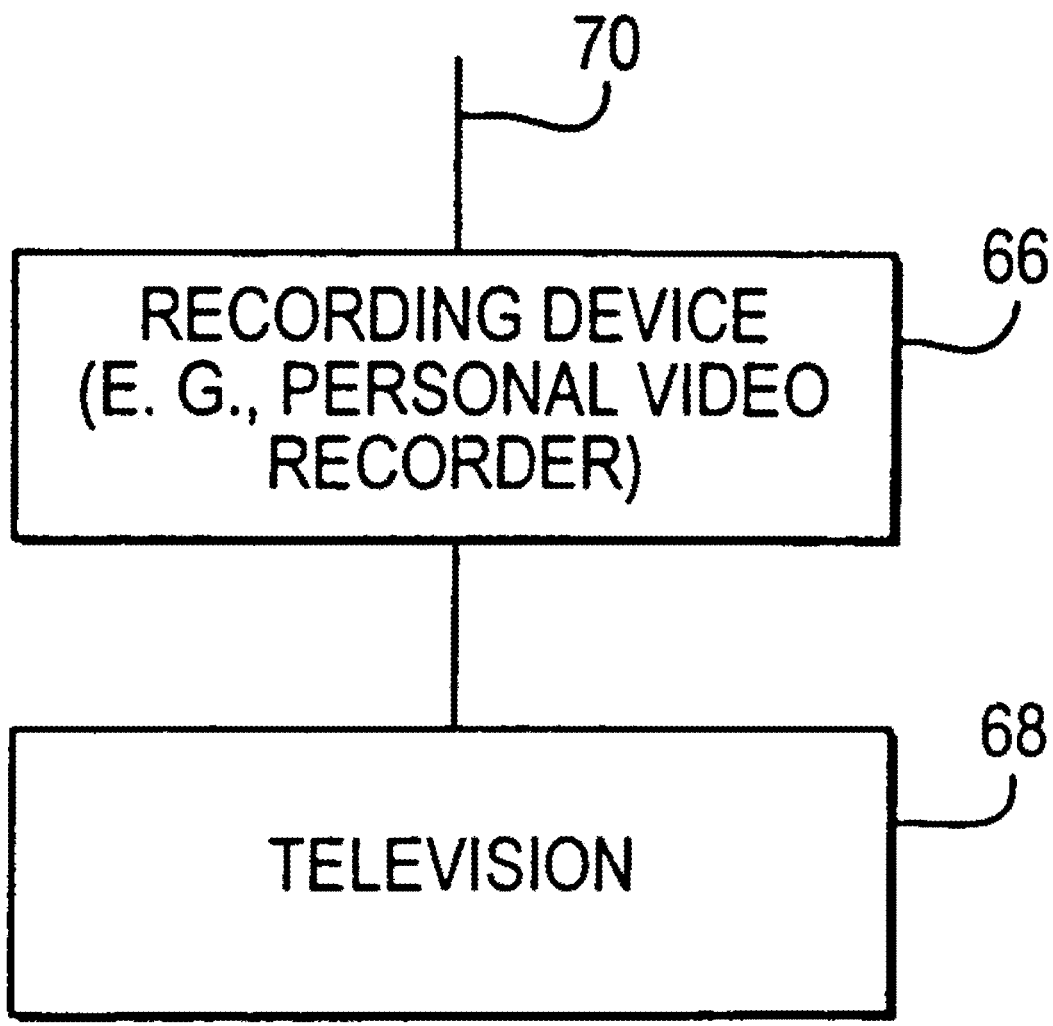
FIG. 3 is a diagram of additional illustrative user television equipment in accordance with the present invention.

Another illustrative arrangement for user television equipment 20 is shown in FIG. 3. In the example of FIG. 3, user television equipment 20 includes a recording device 66 such as a digital video recorder (e.g., a personal video recorder (PVR)) that uses a hard disk or other storage for recording video or may be a digital video disc recorder, compact disc recorder, videocassette recorder, or other suitable recording device. Equipment 20 of FIG. 3 may also include a television 68. Input/output 70 may be connected to communications paths such as paths 27 and 46. Television programming and other information may be received using input/output 70. Commands and requests and other information from the user may be transmitted over input/output 70.

Recording device 66 may contain at least one analog tuner for tuning to a desired analog television channel (e.g., multiple tuners may be provided). Recording device 66 may also contain digital decoding circuitry for receiving digital television and music channels. If desired, recording device 66 may contain circuitry for handling both analog and digital channels. Recording device 66 also contains a processor (e.g., a microcontroller or microprocessor or the like) that is used to execute software applications. Recording device 66 may contain memory such as random-access memory for use when executing applications. Nonvolatile memory may also be used to store a boot-up routine or other instructions. The hard disk and other storage in recording device 66 may be used to support databases (e.g., program guide databases or interactive television application databases). The hard disk or other, storage in recording device 66 may also be used to record video such as television programs or video-on-demand content or other content provided to recording device 66 over input/output 70.

Recording device 66 may have IR communications circuitry or other suitable communications circuitry for communicating with a remote control. Recording device 66 may also have dedicated buttons and a front-panel display. The front-panel display may, for example, be used to display the current channel to which the recording device is tuned.

Recording device 66 may also have communications circuitry such as a cable modem, an ISDN modem, a DSL modem, a telephone modem, a wireless modem, or any other suitable communications circuitry, for communications with other equipment. Such communications may involve the Internet or other suitable communications networks or paths.

If desired, recording device 66 may include a satellite receiver or other equipment that has wireless communications circuitry for receiving satellite signals.

Recording device 66 of FIG. 3 or recording device 62 of FIG. 2 may record new video while previously recorded video is being played back on television 68 or 64. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing. Recording device 66 and 62 may also be used to allow a user to watch a previously-recorded program while simultaneously recording a new program.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. If desired, the functions of components such as set-top box 60, digital video recorder 66, a WebTV box, or PC/TV or the like may be integrated into a television or personal computer or other suitable device.

Figure 4:
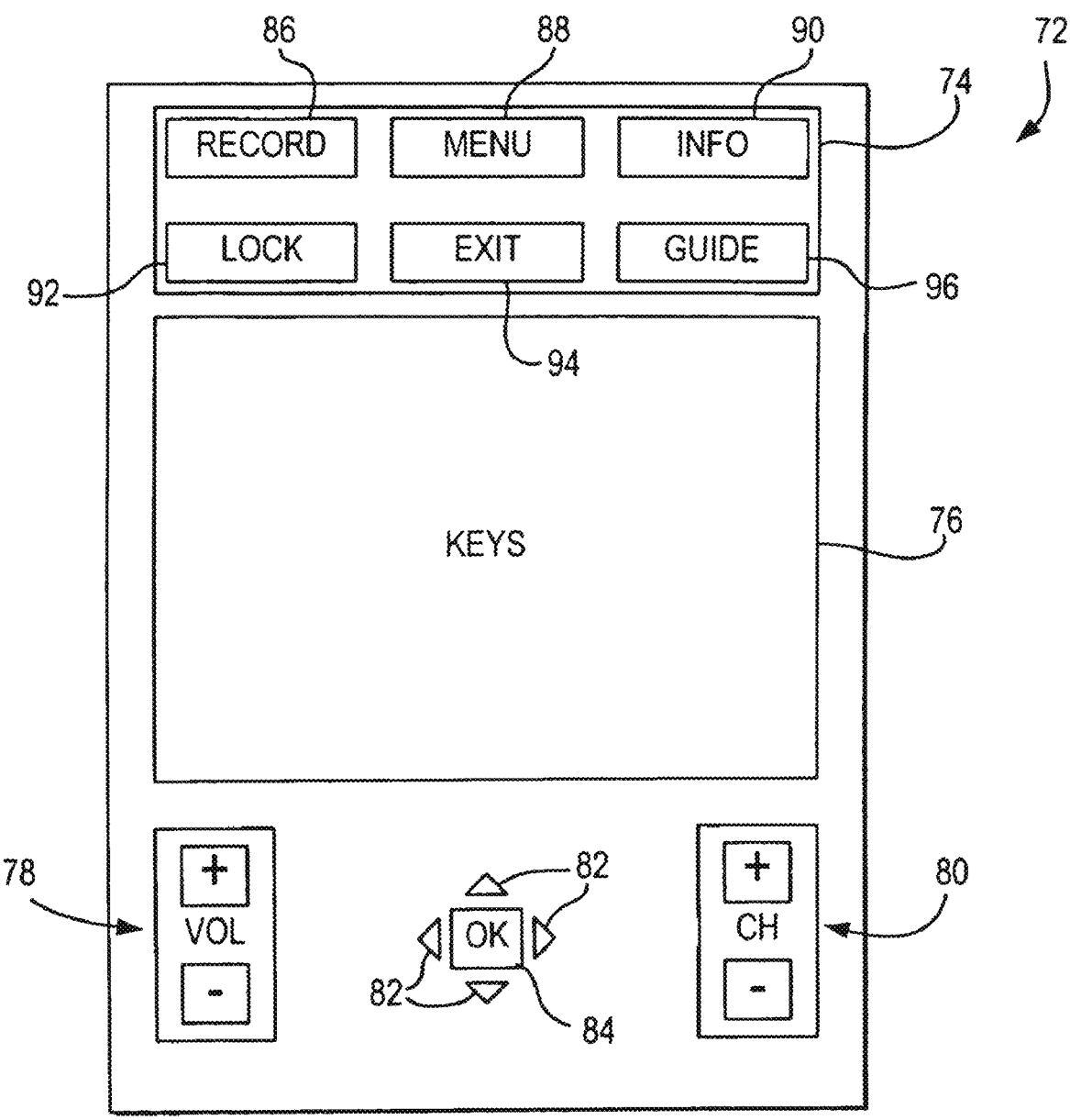
FIG. 4 is a diagram of an illustrative remote control in accordance with the present invention.

An illustrative remote control 72 for operating user television equipment 20 (or suitable user computer equipment 22) is shown in FIG. 4. Remote control 72 may have function keys 74 and other keys 76 such as keypad keys, power on/off keys, pause, stop, fast-forward and reverse keys, and any other suitable keys. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (sometimes called a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, pressing the info button 90 may direct the interactive television application to provide additional program schedule information related to that program listing (e.g., a program summary, actor information, and any other suitable program schedule information).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, or any other suitable criteria. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television program guide.

The keys shown in FIG. 4 are merely illustrative. Other keys or buttons may be provided if desired. For example, a music button may be used to access music with the interactive television application. An edit button may be used to edit stored content (e.g., to remove commercials, remove portions of a video, or edit any other suitable content). Alphanumeric buttons may be used to enter alphanumeric characters. A last or back button may be used to browse backward in the interactive television application (e.g., to return to a previous channel or display screen). Video recorder function buttons such as a play button, pause button, stop button, rewind button, fast-forward button, and record button, may be used to control video recorder functions (local or network-based) in system 10. A help key may be used to invoke help functions such as context-sensitive on-screen help.

Figure 5:
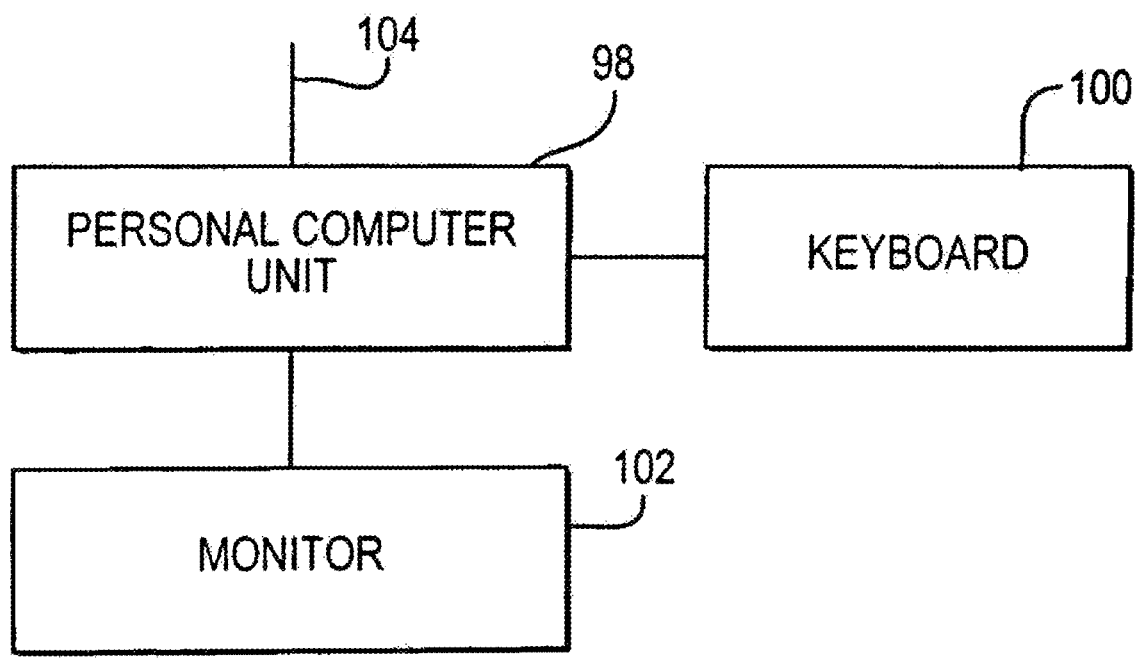
FIG. 5 is a diagram of illustrative user computer equipment in accordance with the present invention.

Illustrative user computer equipment 22 is shown in FIG. 5. In the arrangement of FIG. 5, personal computer 98 may be controlled by the user using keyboard 100 or other suitable user input device, such as a trackball, mouse, touch pad, touch screen, voice recognition system, a remote control such as remote control 72 of FIG. 4, or any other suitable user input device. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Storage in personal computer unit 98 such as a hard drive, DVD drive, CD drive, or other suitable storage device or devices may be used to store video and other content. For example, the interactive television application and personal computer unit 98 may use this storage to provide the functions of a personal video recorder.

User equipment 18 such as user television equipment 20 and user computer equipment 22 may be used with network equipment such as server 56, server 36, and equipment at service providers such as service provider 50 of FIG. 1 to provide network-based video recording functions. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on user equipment 18 in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 6.

Figure 6:
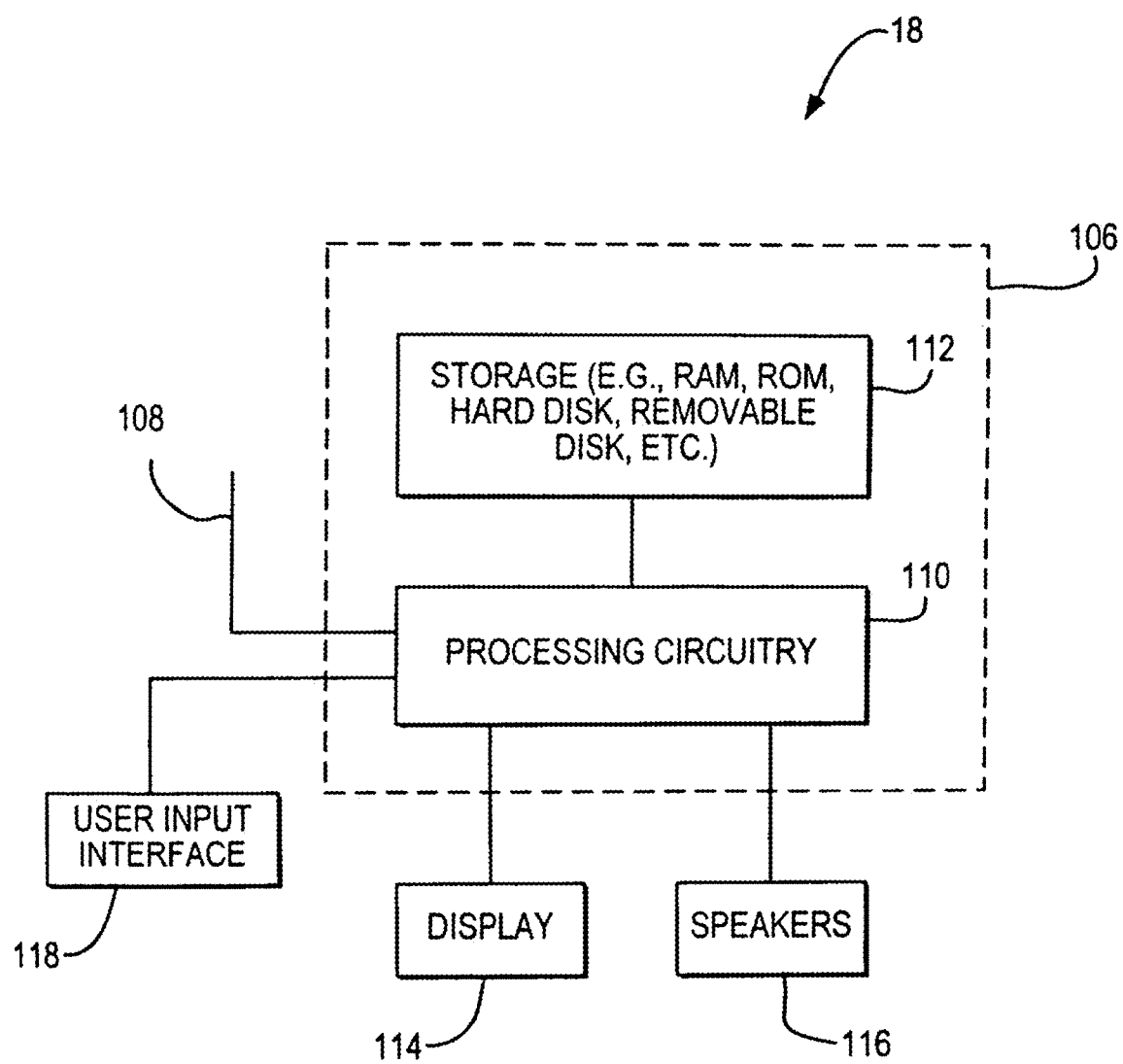
FIG. 6 is a generalized diagram of illustrative user equipment in accordance with the present invention.

As shown in FIG. 6, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television program guide may be received from data source 30 via input/output 108. Input/output 108 may also be used to receive information from data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, or any other suitable processing circuitry. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by user equipment 18 to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. User input interface 118 may be any suitable user interface, such as a mouse, trackball, keypad, keyboard, touch screen, touch pad, voice recognition interface, remote control, or any other suitable user input interface.

An interactive television program guide having various interactive television program guide interface screens may be provided to assist a user in selecting television programs. Examples of the various interactive television program guide interface screens are described, for example, in Ellis U.S. patent application Ser. No. 10/306,175, filed Nov. 25, 2002, which is hereby incorporated by reference herein in its entirety.

As the number of available television programs grows, it becomes increasingly more confusing and burdensome for a user to select television programs that are of interest to the user. One approach to mitigate this problem is for an interactive television program guide application to suggest television programs to a user that may be of interest. For example, the interactive television program guide application may suggest television programs to the user based on the user's previous television viewing habits. The interactive television program guide application may derive the user's viewing habits by, for example, identifying and categorizing those television programs towards which the user has shown interest.

In some embodiments of the present invention, the interactive television program guide application may query the user as to the user's interests in television programs by using questions formulated based on those television programs towards which the user has shown interest. It will be understood that the term "questions" is not limited to textual queries but may include any suitable types of questions, prompts, options, or any other suitable tool for soliciting user responses. As an example, the interactive television program guide application may query the user regarding the user's preferences towards various actors in a television program using checkboxes. As another example, the interactive television program guide application may prompt the user to add a television program to a favorites list using a user-selectable button. As another example, the interactive television program guide application may provide an opportunity for the user to record a television program using, for example, a personal video recorder (PVR). As yet another example, the interactive television program guide application may prompt the user to schedule a television program for recording to a PVR by, for example, allowing the user to add the television program to a recording schedule. The interactive television program guide application may use various-other suitable questions to automatically query the user regarding the user's interest. Some suitable approaches will be discussed in more detail below.

In one suitable approach, in response to determining that the user has shown interest towards a particular television program, the interactive television program guide application may formulate questions based on various attributes of the television program. These questions may then be displayed to the user by the interactive television program guide application at a suitable time. The suitable time for displaying these formulated question may be automatically determined by the interactive television program guide application or may be determined by the user. In some embodiments of the present invention, the interactive television program guide application may allow the user to initiate displaying of formulated questions by, for example, pressing a suitable button on a remote control (e.g., remote control 74 of FIG. 4). In some embodiments of the present invention, the interactive television program guide application may allow the user to specify, for example, during setup, suitable times for the interactive television program guide application to present formulated questions to the user.

Once the interactive television program guide application gathers responses to these questions, it may subsequently use the responses to identify television programs that are likely to be of interest to the user. Ultimately, these identified television programs may be recommended or otherwise displayed to the user as suggestions by the interactive television program guide application. The interactive television program guide application may automatically determine a suitable time for suggesting these television program to the user or the interactive television program guide application may allow the user to request for such suggestions. As an example, the interactive television program guide application may allow the user to request for suggestions by, for example, pressing a suitable button on a remote control (e.g., remote control 74 of FIG. 4). In some embodiments of the present invention, the interactive television program guide application may allow the user to specify, for example, during setup, suitable times for the interactive television program guide application to suggest television programs to the user.

Figure 7:
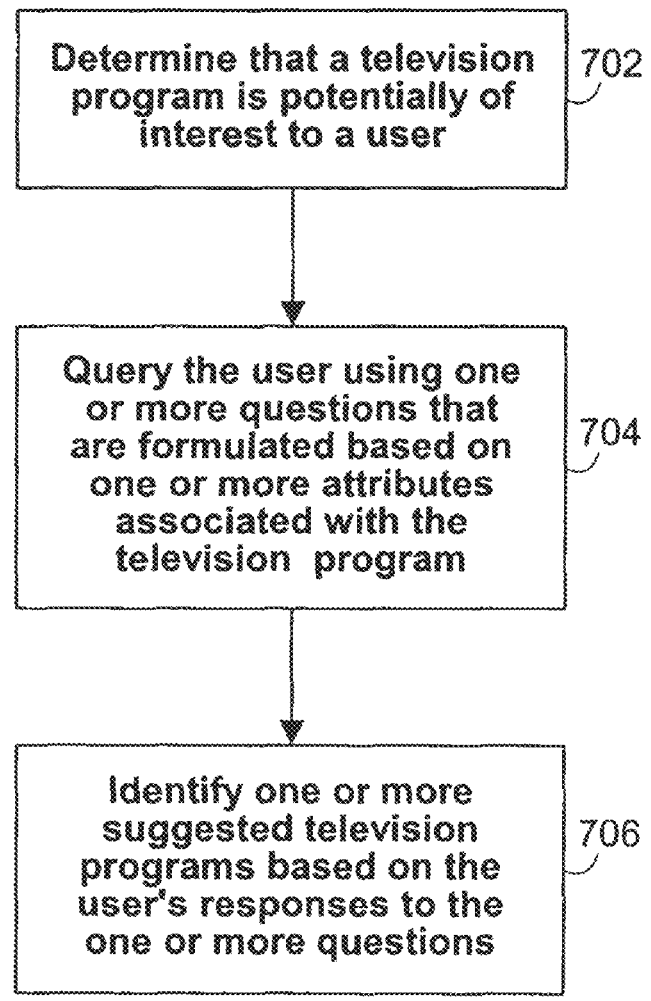
FIG. 7 is a flowchart of illustrative steps involved in suggesting television programs to a user in accordance with the present invention.

FIG. 7 shows a general flowchart of illustrative steps involved in identifying television programs to suggest to the user based on the user's responses to tailored questions in accordance with some embodiments of the present invention.

At step 702, the interactive television program guide application determines that a television program is potentially of interest to a user. The interactive television program guide application may use various suitable approaches to determine potential television programs of interest. Some examples of suitable approaches will be described in detail below.

At step 704, the interactive television program guide application queries the user regarding the user's interest in television programs using one or more tailored questions. The questions are formulated based on one or more attributes associated with the television program that has been identified as a potential television program of interest by the interactive television program guide application at step 702.

The types of information that may be provided by the attributes associated with a television program may include, for example, category, type, genre, any other suitable information associated with the television program, or any combination thereof. In some embodiments of the present invention, additional attributes associated with, for example, a particular category, type, or genre of television program may also be identified. As an example, for a television program in the movie category, the interactive television program guide application may have access to additional attributes such as the cast members, director, producer, storyline, time period, or any other suitable attribute specific to a movie. In some embodiments of the present invention, the interactive television program guide application may also have access to relationship attributes that describe the television program's relationship with a past program, a future program, a related serial or any other suitable television programming. For example, in connection with a past television program, the interactive television program guide application may have access to relationship attributes that reveal any sequels, episodes in a serial, or any other suitable related television programs.

Once the interactive television program guide application gathers the user's responses to the questions, the interactive television program guide application then identifies one or more television programs to suggest to the user at step 706 that are based on the user's responses.

Detailed descriptions and examples of the various steps involved in identifying and suggesting television programs to a user based on queries using tailored questions will be discussed fully below.

The interactive television program guide application may use various methods to identify those television programs toward which the user has shown interest. For example, the interactive television program guide application may take note of the various television programs that the user has watched. This approach, however, may prove to be inaccurate in evaluating user interest due to the large number of television programs that the user browses that are not necessarily of interest to the user. To improve upon this approach, the interactive television program guide application may identify a smaller set of those television programs to which the user has shown more substantial interest.

In some embodiments of the present invention, the interactive television program guide application may determine whether the user is casually channel surfing past a television program or whether the television program has actually captured the user's interest in a more significant manner. The interactive television program guide application may make such a determination, for example, by monitoring the amount of time that the user spends watching the television program.

As an example, the interactive television program guide application may monitor the amount of time that the user spends watching a particular program in one continuous time period. The interactive television program guide application may then, for example, mark the television program that the user watches for a continuous period of time that is greater than a predetermined period of time as a potential program of interest. The interactive television program guide application may mark a television program as a potential television program of interest by, for example, inserting a flag into the data associated with the television program in a database (e.g., program listing information stored in a database), encoding such information into the datastream associated with the television program, storing a listing of the television program in a potential interest list, or using any other suitable approach to mark the television program so that the interactive television program guide application recognizes it as a potential television program of interest.

As another example, the interactive television program guide application may monitor the cumulative time that the user spends watching a particular television program. The interactive television program guide application may compute the cumulative time by, for example, adding together the time periods that the user has spent watching the particular television program during a time period within which the user has also watched other television programs (as opposed to continuously watching the particular television program, as described above). If the cumulative time exceeds a predetermined period of time, the interactive television program guide application may mark the television program as a potential program of interest.

As another example, the interactive television program guide application may monitor when the user stops watching a television program (e.g., when a commercial begins) and whether the user returns to watching the television program (e.g., after browsing through other programs). If the user returns to watching the television program, the interactive television program guide application may mark the television program as a potential television program of interest. In some embodiments of the present invention, the interactive television program guide application may treat turning off the television as an interruption that is similar to the commercial example described above. In response to a user turning the television back on, the interactive television program guide application may determine the length of time that the television had been turned off. If the time period that the television had been off is short, for example, when compared to a predetermined period of time, the interactive television program guide application may determine whether the user has returned to watching the television program that the user had been watching before turning off the television. If the user has returned to watching the same television program, the interactive television program guide may mark the television program as a potential television program of interest.

The examples described above are merely illustrative of the type of approaches that may be used to identify potential television programs of interest. Any other suitable approaches may be used.

Figure 8:
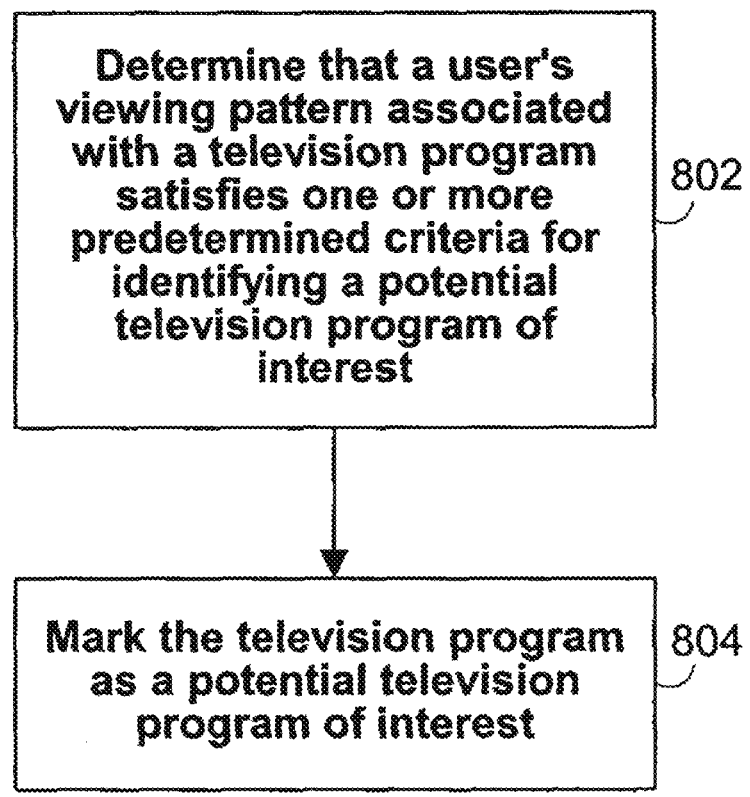
FIG. 8 is a flowchart of illustrative steps involved in identifying a potential television program of interest in accordance with the present invention.

FIG. 8 is a flowchart of illustrative steps involved in identifying a potential television program of interest in accordance with some embodiments of the present invention.

At step 802, the interactive television program guide application determines whether the user's viewing pattern associated with a television program (e.g., continuous viewing period, cumulative viewing period, or any other suitable viewing pattern indicator) satisfies one or more predetermined criteria for identifying a potential program of interest.

If the user's viewing pattern satisfies one or more predetermined criteria, the interactive television program guide application then marks the television program as a potential television program of interest at step 804.

Once the interactive television program guide application determines that the user has shown interest towards a particular television program using any suitable approach, the interactive television program guide application may use various characteristics of the television program to assist in identifying other television programs that may be of interest to the user.

In some embodiments of the present invention, the interactive television program guide application may formulate a series of questions in order to, for example, query the user regarding characteristics of the particular television program that may have made it interesting to the user. These questions may, for example, allow the user to add the television program or related television programs to the user's favorites list (e.g., when the television program is a part of a series of programs), allow the user to set reminders for the television program or related television programs, confirm the user's interest in various attributes associated with the television program (e.g., interest in a particular actor) for use in making future programming recommendations to the user, or obtain any other suitable information for identifying television programs of potential interest to the user.

The interactive television program guide application may formulate the questions displayed to the user by, for example, basing the questions on various attributes associated with the particular television program as described above. The various attributes associated with the particular television program may be predetermined by, for example, the distributor of the television program, content creator, or any other suitable source of the television program. The attributes associated with the television programs may be transmitted to the user equipment, for example, along with other interactive television program guide information.

Based on these predetermined attributes, when the interactive television program guide application identifies a potential television program of interest, the interactive television program guide application may formulate tailored questions to query the user regarding the user's interest in what have been identified as related television programs.

As an example, the interactive television program guide application may determine from an attribute associated with a potential television program of interest that the television program is an episode of a serial. Upon making such a determination, the interactive television program guide application may formulate a question that allows the user to add the serial to the user's favorite list. As another example, the interactive television program guide application may determine from attributes associated with a potential television program of interest that the program is a dramatic movie starring a particular actor. The interactive television program guide application may then formulate a question to query the user regarding the user's preference for other television programs starring the same actor or for other dramatic movies.

In some embodiments of the present invention, the interactive television program guide application may omit certain types of questions based on attributes associated with a television program. For example, upon determining that an attribute associated with television program reveals that the television program is a dramatic movie having no related television programs (e.g., sequels, serials, or any other suitable related television program), the interactive television program guide application may avoid the formulation of a question that prompts the user to add the movie to the user's favorites list. Based on this attribute, the interactive television program guide application may also determine that the user is not likely to want to view the same movie more than once, and may therefore avoid prompting the user to set a reminder for future occurrences of the movie.

It will be understood that while the interactive television program guide application may not display certain questions to the user based on attributes associated with a particular television program, the interactive television program guide application may nonetheless provide the user with the opportunity to request such options. For example, the user may request to add a movie to favorites, for example, by pressing a menu button on the user's remote control (e.g., remote control 72 of FIG. 4) to access favorites options provided by the interactive television program guide or using any other suitable request method.

Figure 9:
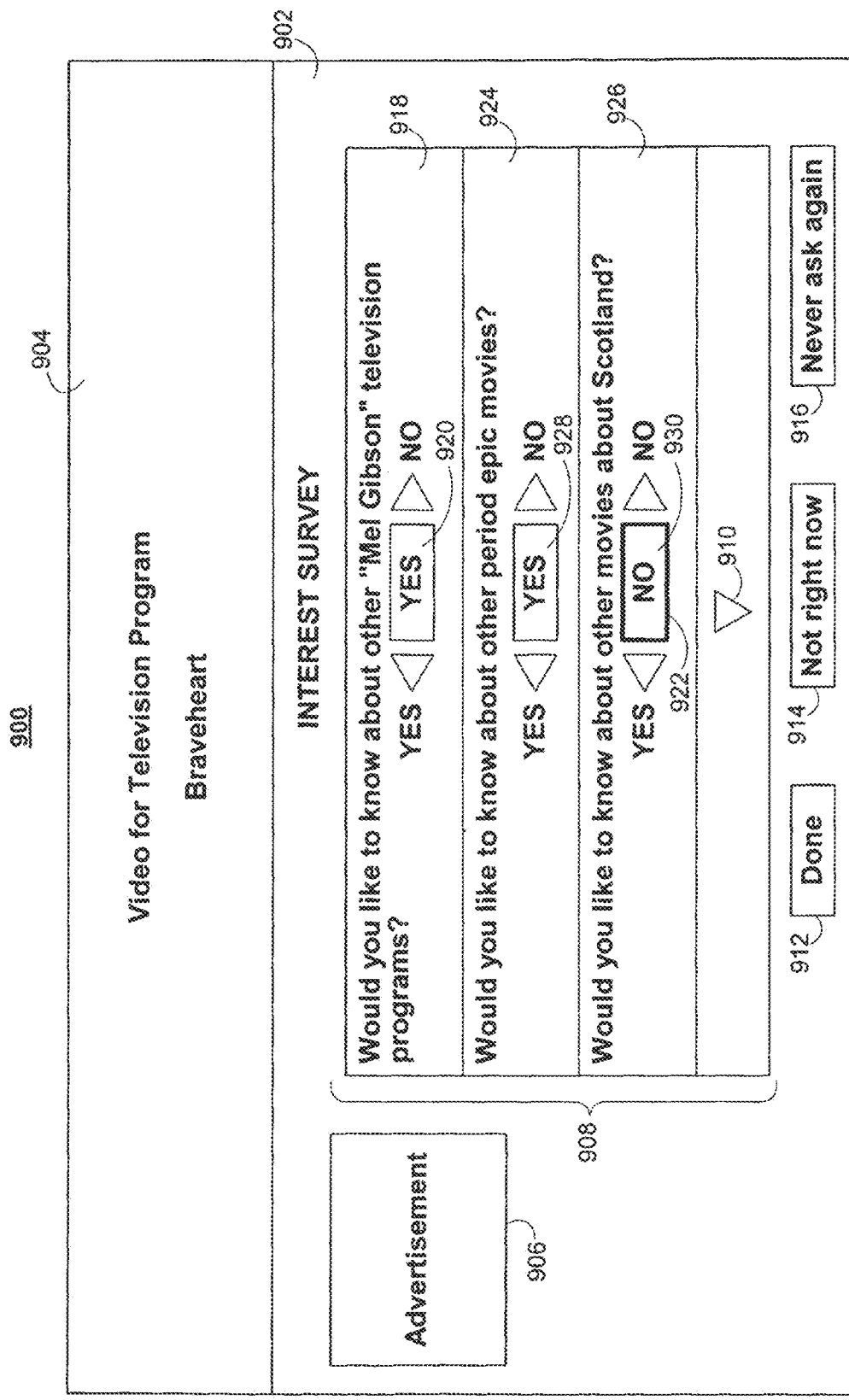
FIG. 9 shows an illustrative television screen containing an interest survey window associated with a movie in accordance with the present invention.
Figure 10:
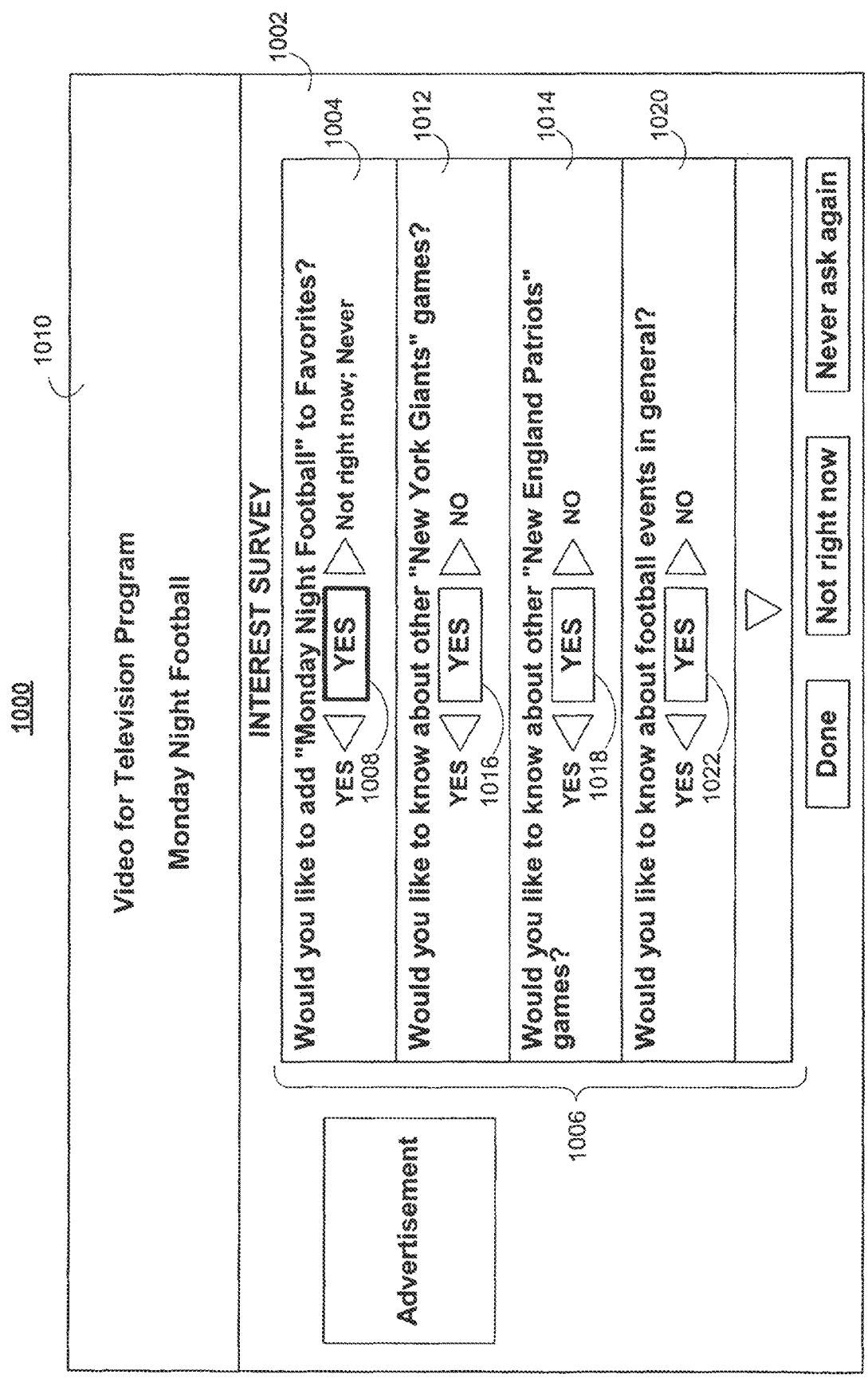
FIG. 10 shows an illustrative television screen containing an interest survey window associated with a sporting event in accordance with the present invention.
Figure 11:
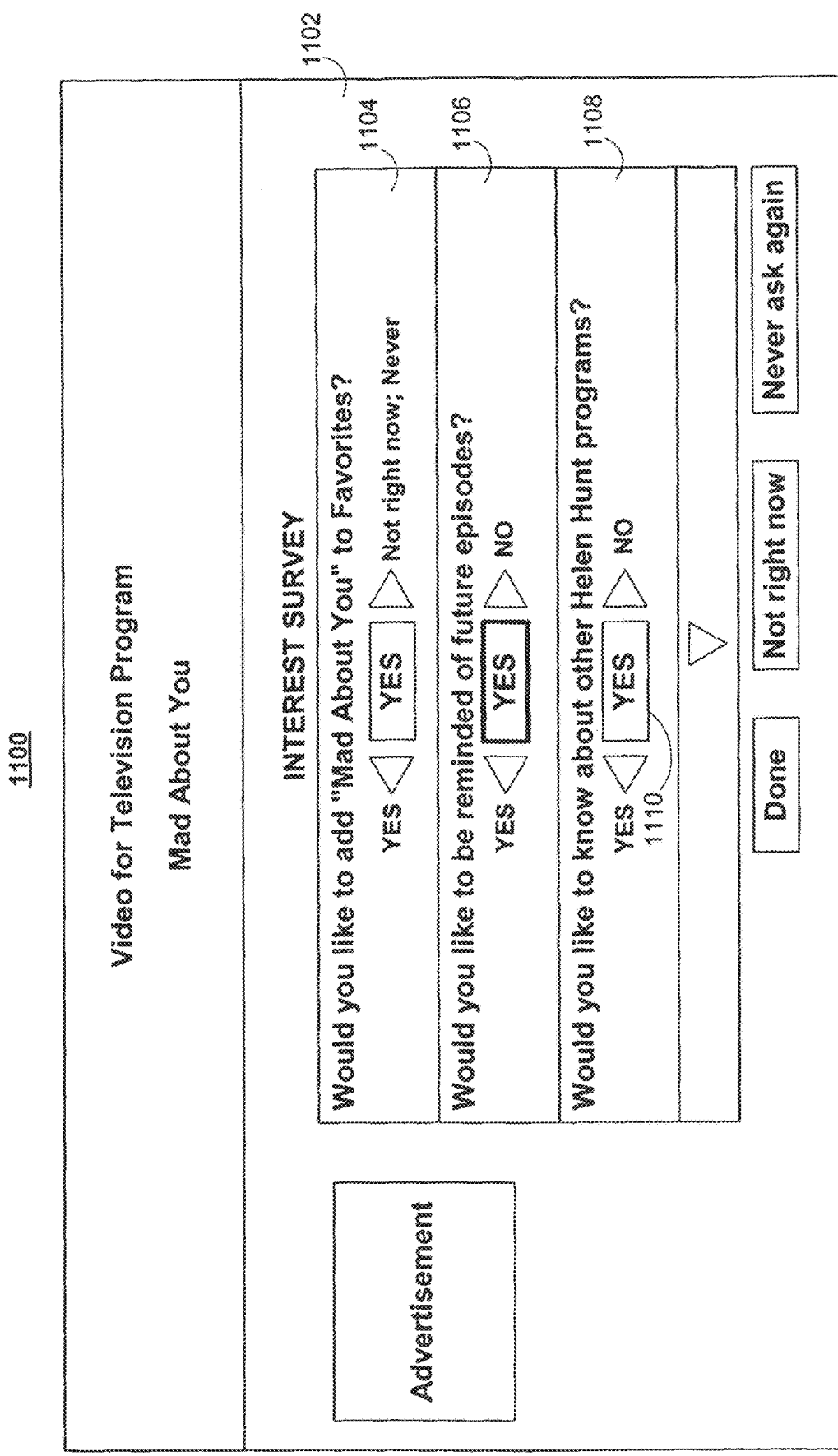
FIG. 11 shows an illustrative television screen containing an interest survey window associated with an episode of a serial in accordance with the present invention.

FIGS. 9 to 11 demonstrate various questions that may be displayed to a user by the interactive television program guide application based on attributes that are associated with a potential television program of interest. While the examples of FIGS. 9 to 11 are shown as television screens in accordance with the present invention, it will be understood that various other types of screens, such as computer screens, screens of personal digital devices, or any other suitable display arrangement, may be used.

FIG. 9 shows an illustrative television screen 900 containing an interest survey window 902 associated with a movie in accordance with some embodiments of the present invention. Television screen 900 containing interest survey window 902 may be displayed to the user, for example, in response to the interactive television program guide application determining that the user has demonstrated interest in the movie "Braveheart" (e.g., by watching "Braveheart" for a continuous period of time that is greater than a predetermined period of time). The interactive television program guide application may continue to display video of the movie in video window 904, occupying the top portion of television screen 900. The interactive television program guide application may display one or more questions formulated based on attributes associated with the movie in interest survey window 902, which occupies the bottom portion of television screen 900. The interactive television program guide application may display interest survey window 902 as an overlay on top of video window 904 or in any other suitable arrangement.

Interest survey window 902 may include, for example, an advertisement 906, a list 908 of one or more questions formulated based on various attributes associated with the television program displayed in video window 904, directional key 910 for accessing additional questions, buttons 912, 914, and 916 for submitting, deferring, and skipping selections respectively, and any other suitable features. If the user selects button 912, the interactive television program guide application may gather the user's responses to the questions for use in identifying television programs to suggest to the user. If the user selects button 914, the interactive television program guide application may display interest survey window 902 or any other suitable interface having the same questions at a later time. If the user selects button 916, the interactive television program guide application may remove interest survey window 902 from television screen 900 and refrain from querying the user with the same questions again. In some embodiments of the present invention, if the user closes interest survey window 902 without answering any questions, the interactive television program guide application may display interest survey window 902 or any other suitable interface having the same questions to the user at a later time.

In this particular example, the interactive television program guide application has omitted any questions regarding saving the movie displayed in video window 904 to the user's favorites list. This is because one or more attributes associated with "Braveheart" indicate to the interactive television program guide application that "Braveheart" is a movie having no closely related television programs.

In the example of FIG. 9, the interactive television program guide application has determined from one of the attributes associated with the movie that Mel Gibson is the starring actor in this movie. Accordingly, the interactive television program guide application provides question 918 in list 908 to allow the user to indicate an interest in other television programs starring Mel Gibson. The user may confirm such an interest, for example, by setting toggle button 920 to "yes." This may be accomplished by placing highlight region 922 on toggle button 920 and then using directional arrows on a remote control (e.g., remote control 72 of FIG. 4) to toggle to choice "yes." The interactive television program guide application also queries the user with questions 924 and 926 through which the user may confirm interests towards other attributes associated with the movie "Braveheart" (e.g., period epic, Scotland, or any other suitable attribute). The user may respond to these questions using toggle buttons 928 and 930, respectively.

Television screen 900 containing an interest survey window 902 is merely illustrative of such a display screen. Various other suitable arrangements may be used.

FIG. 10 shows another example of an illustrative television screen 1000 containing an interest survey window 1002 associated with a sporting event in accordance with some embodiments of the present invention. The interactive television program guide application may display interest survey window 1002, for example, in response to identifying "Monday Night Football" as a television program that is of interest to the user (e.g., by determining that the user has watched "Monday Night Football" for a continuous period of time that is greater than a predetermined period of time).

In the example of FIG. 10, the interactive television program guide application has determined from an attribute associated with "Monday Night Football" that it is a recurring television program. Accordingly, the interactive television program guide application has formulated and provided the user with question 1004 in the list of questions 1006 shown within interest survey window 1002 to enable the user to add "Monday Night Football" to the user's favorites list. In connection with this question, the user may select whether to add the program to the favorites list at the present time, at a later time, or never, using toggle button 1008. If the user chooses "yes," the interactive television program guide application may add the program to the user's favorite list. If the user chooses "not right now," the interactive television program guide application may query the user again at another time. If the user chooses "never," indicating the user's lack of interest in this television program, the interactive television program guide application may refrain from querying the user in the future. In some embodiments of the present invention, in response to a user response of "never," the interactive television program guide application may refrain from querying about or assign a lower priority to similar television programs in the future.

In the example of FIG. 10, the interactive television program guide application has also determined from other attributes associated with "Monday Night Football" that the game displayed for the user in video window 1010 is between the New York Giants and the New England Patriots. Based on this information, the interactive television program guide application may formulate questions 1012 and 1014 to allow the user to indicate an interest in these two teams using toggle buttons 1016 and 1018, respectively. Also in this example, the interactive television program guide application has determined based on a category attribute that "Monday Night Football" is a football event. Thus, the interactive television program guide application additionally displays question 1020 in interest survey window 1002 to query the user as to the user's interest in other football events. The user may respond to question 1020 using toggle button 1022.

Television screen 1000 containing interest survey window 1002 is merely illustrative of such a display screen. Various other suitable arrangements may be used.

FIG. 11 shows another example of an illustrative television screen 1100 containing interest survey window 1102 associated with an episode of a serial in accordance with some embodiments of the present invention. The interactive television program guide application may display interest survey window 1102, for example, in response to determining that the user has shown interest towards an episode of a serial. In this example, the interactive television program guide application has determined from attributes associated with the episode of "Mad About You" that the episode is related to one or more other episodes in a serial. In response to making such a determination, the interactive television program guide application prompts the user with questions 1104 and 1106 to allow the user to add the serial to the user's favorites list and to set reminders for future episodes of the serial, respectively.

In this example, the interactive television program guide application has also identified, through examination of the associated attributes, that the serial casts actress Helen Hunt. Accordingly, the interactive television program guide application provides the user with question 1108 regarding the user's interest in other television programs starring Helen Hunt. The user may confirm such an interest, for example, by setting toggle button 1110 to "yes."

Television screen 1100 containing interest survey window 1102 is merely illustrative of such a display screen. Various other suitable arrangements may be used.

As described above, as the user watches television, the interactive television program guide application may automatically determine if the current television program is a potential television program of interest. Once the interactive television program guide application identifies the television program as a potential television program of interest, the interactive television program guide application may formulate questions associated with the television program as the user watches the program. In some embodiments of the present invention, the interactive television program guide application may also formulate questions associated with the television program after the user has finished watching the television program. Suitable time for formulating questions associated with a television program may be automatically determined by the interactive television program guide, pre-determined by the content distributor, determined by the user (e.g., during setup), or determined using any other suitable approach. The interactive television program guide application may then display the formulated questions to the user at a suitable time. For example, the interactive television program guide application may display the questions to the user during the presentation of the television program, immediately after the presentation of the television program, during a commercial break, in response to the user switching channels, in response to the user turning on the television, or at any other suitable time. Some suitable approaches for displaying the formulated questions to the user are described in detail below.

In one suitable approach, the interactive television program guide application may display questions formulated in association with a particular television program when the user initiates interaction with the program guide during the presentation of the particular television program. The user may initiate interaction with the program guide by, for example, requesting display of the guide, changing channels, or using any other suitable approach. In another suitable approach, the interactive television program guide application may display the questions to the user in response to the user initiating interaction with the program guide within a predetermined time period after the end of the particular television program. In yet another suitable approach, the interactive television program guide application may automatically display the questions to the user at the end of the particular television program or at any other suitable time determined by the interactive television program guide application.

Figure 12:
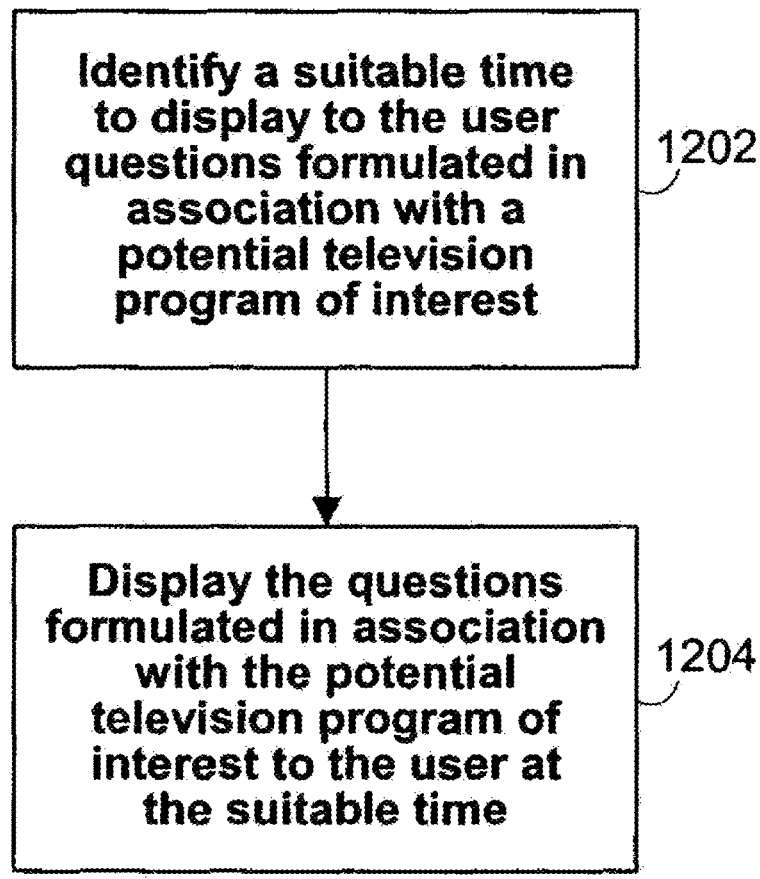
FIG. 12 is a flowchart of illustrative steps involved in identifying a suitable time for presenting to the user questions formulated in association with a potential television program of interest in accordance with the present invention.

FIG. 12 shows a flowchart of illustrative steps involved in displaying to the user at a suitable time questions formulated in association with a potential television program of interest in accordance with some embodiments of the present invention.

At step 1202, the interactive television program guide application identifies a suitable time for displaying to the user questions that have been formulated in association with a potential television program of interest using any suitable approach.

The interactive television program guide application then displays the questions formulated in association with the potential television program of interest to the user at step 1204.

Once the interactive television program guide application has gathered the user's responses to the various questions, the interactive television program guide application may assist the user in selecting television programs of interest in various ways. In some embodiments of the present invention, the interactive television program guide application, in response to the user invoking a favorites view of the guide (e.g., a program guide view containing user favorites information, including the user's favorites list), may prominently display those favorite programs that are about to start. The interactive television program guide application may also provide to the user, in the favorites view, those suggested television programs that have been identified by the interactive television program guide application. For example, the interactive television program guide application may have identified these suggested television programs by using the user's responses to questions previously displayed to the user.

FIG. 13 shows one example of an illustrative favorites screen 1300 in accordance with some embodiments of the present invention. Favorites screen 1300 may prominently display in the top portion of the screen a list 1302 of favorite programs that are about to start. The user may adjust the time frame for displaying the favorite programs using directional arrows 1304 and 1306. Alternatively, the user may use suitable directional buttons on the user's remote control (e.g., remote control 72 of FIG. 4) or any other suitable means for adjusting the time frame.

Favorites screen 1300 may also include a suggested television program list 1308. The interactive television program guide application may have identified these suggested television programs using at least partially, for example, the user's responses to questions previously displayed to the user. Suggested television program list 1308 may be sorted to prominently display those suggested television programs that are about to start (e.g., at the top of the list).

The user may access additional favorite programs and additional suggested programs by scrolling down favorites list 1302 and suggested television program list 1308 using arrows 1310 and 1312. Alternatively, the user may access complete lists of favorite programs and recommended programs by selecting "favorites list" button 1314 and "recommended" button 1316, respectively.

In some embodiments of the present invention, the interactive television program guide application may include in favorites screen 1300 options to provide the user with preview information on interesting upcoming television programs. In this particular example, favorites screen 1300 includes "coming up today" button 1318 and "coming up this week" button 1320 to provide the user with such information. In response to a user selection of "coming up today" button 1318, for example, the interactive television program guide application may refresh favorites screen 1300 to display to the user a list of television programs coming up on the present day that are in the user's favorites list, having been identified as suggested television programs, or both. Similarly, in response to a user selection of "coming up this week" button 1320, for example, the interactive television program guide application may refresh favorites screen 1300 to display to the user a list of television programs coming up in the current week.

Figure 14:
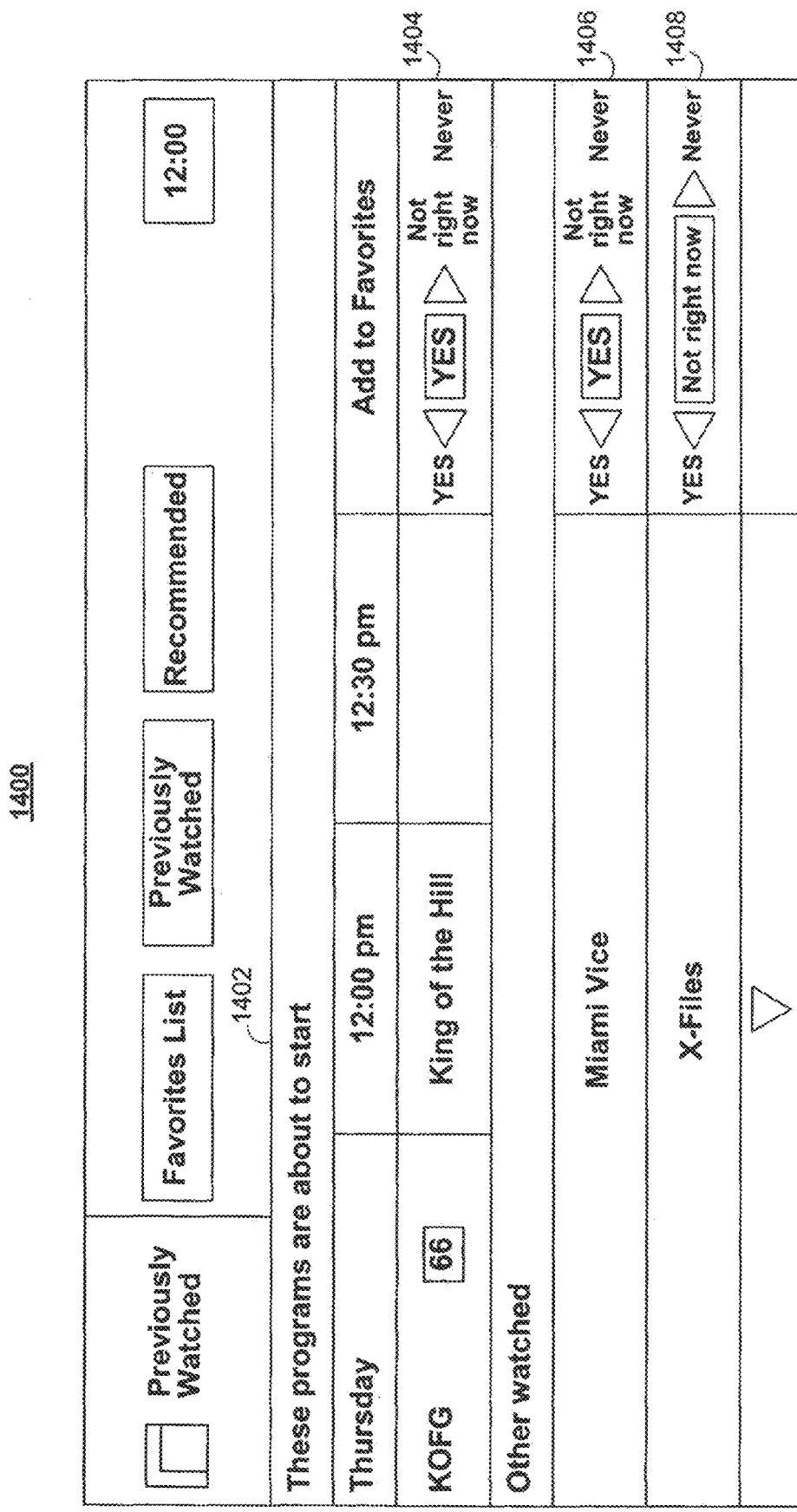
FIG. 14 shows an illustrative previously watched list screen in accordance with the present invention.

In this particular example, a "previously watched" button 1322 is provided on favorites screen 1300. In response to the user selecting "previously watched" button 1322, the interactive television program guide application may display to the user a previously watched screen 1400, as shown in FIG. 14, in accordance with some embodiments of the present invention. Previously watched screen 1400 may be similar in layout to favorites screen 1300 of FIG. 13. However, in place of the user's favorites list, the interactive television program guide application may display a previously watched list 1402 of those television programs that the user has shown interest towards, but has not yet added to the user's favorite list (e.g., the user has previously selected "not right now" when asked whether the user would like to add the program to favorites).

The interactive television program guide application may prominently display on previously watched screen 1400 those television programs that are about to start. In this particular example, the interactive television program guide application provides options 1404, 1406, and 1408 for the user to select whether to add any of these previously watched programs to the user's favorites list. If the user again chooses "not right now," the interactive television program guide application may keep the television program on previously watched list 1402 to be displayed to the user at a later time. However, if the user chooses "never," or if the user ignores the television program on previously watched list 1402 for a predetermined period of time, the interactive television program guide application may remove the television program from previously watched list 1402.

Previously watched screen 1402 is merely illustrative of such a display screen. Various other suitable arrangements may be used.

In some embodiments of the present invention, the interactive television program guide application may bring to the user's attention favorite and suggested television programs that are scheduled to air in or near a time frame. The time frame may be a time frame within which the user is currently browsing, for example, in the interactive television program guide listings.

Figure 15:
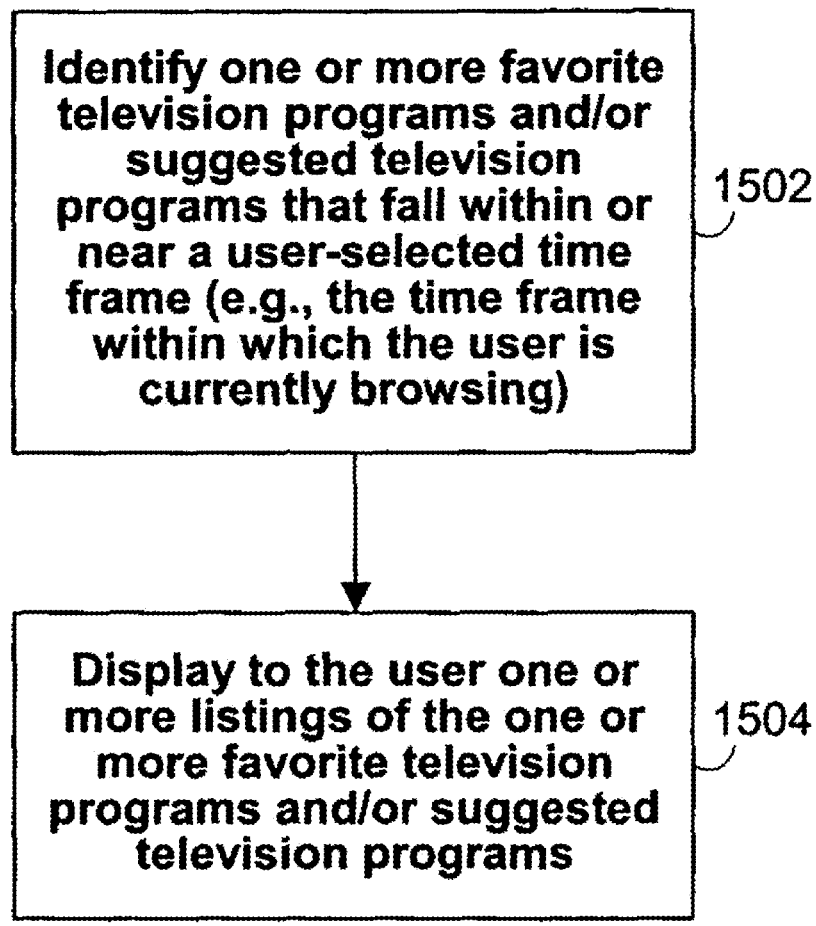
FIG. 15 is a flowchart of illustrative steps involved in alerting the user as to listings of favorite television programs, suggested television programs, or both, within a time frame that the user is currently browsing in accordance with the present invention.

FIG. 15 is a flowchart of illustrative steps involved in alerting the user to listings of favorite television programs, suggested television programs, or both, that are within or near the time frame that the user is currently browsing in the program guide in accordance with some embodiments of the present invention.

At step 1502, the interactive television program guide application identifies one or more listings of favorites television programs, suggested television programs, or both, that are within or near a user-selected time frame. For example, the user-selected time frame may be the time frame that the user is currently browsing (e.g., in a program guide). The interactive television program guide application then alerts the user to the one or more favorite television programs, suggested television programs, or both using, for example, a suggestion overlay such as suggestion overlay 1600 of FIG. 16 (step 1504).

FIG. 16 shows a suggestion overlay 1600 that may be displayed by the interactive television program guide application to alert the user of favorite programs and suggested programs that are within or near a user-selected time frame in accordance with some embodiments of the present invention. In this particular example, program listings window 1602 shows that the user is currently browsing program listings in the 12:00-12:30 pm time frame on Thursday. In response to determining that favorite programs as well as suggested programs are available within or near this time frame, the interactive television program guide application displays suggestion overlay 1600 containing a list of these television programs. The interactive television program guide application may allow the user to close suggestion overlay 1600 using close button 1604. In some embodiments of the present invention, the interactive television program guide application may allow a user to prevent the interactive television program guide application from displaying suggestion overlay 1600, any other pop-up windows (e.g., containing questions associated with a television program), or any combination of overlays and windows thereof. For example, the interactive television program guide application may provide an option for the user to disable displaying of these overlays and pop-up windows during set-up.

Suggestion overlay 1600 is merely illustrative of such a display screen. Various other suitable arrangements may be used.

The foregoing is merely illustrative of the principles of this invention and various modifications can be made by those skilled in the art without departing from the scope and spirit of the invention.

What is claimed is:

1. A method comprising:
    at a first computer comprising a processor and a communications network interface:
        determining that a first media content is potentially of interest to a user;
        generating media content information associated with the first media content;
        sending, using the communications network interface, the media content information associated with the first media content to a second computer associated with the user for automatic display;
        generating, for automatic display at the second computer, the media content information associated with the first media content and a prompt related to user interest in the first media content;
        receiving, from the second computer and using the communication network interface, a response to the prompt, the response comprising an indication that media content information related to the first media content should be less likely to be automatically displayed;
        identifying, using the processor, a second media content associated with an attribute of the first media content; and
        reducing a likelihood that media content information associated with the second media content is automatically displayed to the user in the future based on the indication.

2. The method of claim 1, wherein reducing the likelihood that the media content information associated with the second media content is automatically displayed to the user in the future comprises preventing the media content information associated with the second media content from being automatically displayed.

3. The method of claim 1, wherein generating for automatic display the media content information associated with the first media content and the prompt related to user interest in the first media content comprises identifying a suitable time to automatically display the media content information associated with the first media content and the prompt related to user interest in the first media content.

4. The method of claim 1, wherein reducing the likelihood that the media content information associated with the second media content is automatically displayed includes forgoing generating for display by the second computer the media content information associated with the second media content.

5. The method of claim 1, wherein the media content information associated with the first media content includes an advertisement associated with the first media content.

6. The method of claim 1, wherein the media content information associated with the first media content includes real-time data associated with the first media content.

7. The method of claim 1, wherein the media content information associated with the first media content includes content based on the attribute of the first media content.

8. The method of claim 1, wherein the media content information associated with the second media content is an advertisement associated with the second media content.

9. A non-transitory computer-readable storage medium storing one or more programs, the one or more programs comprising instructions, which when executed by one or more processors of an electronic device, cause the electronic device to:
- determine that a first media content is potentially of interest to a user;
- generate media content information associated with the first media content;
- send, using a communications network interface, the media content information associated with the first media content to a second computer associated with the user for automatic display;
- generate, for automatic display at the second computer, the media content information associated with the first media content and a prompt related to user interest in the first media content;
- receive, from the second computer and using the communication network interface, a response to the prompt, the response comprising an indication that media content information related to the first media content should be less likely to be automatically displayed;
- identify a second media content associated with an attribute of the first media content; and
- reduce a likelihood that media content information associated with the second media content is automatically displayed to the user in the future based on the indication.

10. The non-transitory computer-readable storage medium of claim 9, wherein reducing the likelihood that the media content information associated with the second media content is automatically displayed to the user in the future comprises preventing the media content information associated with the second media content from being automatically displayed.

11. The non-transitory computer-readable storage medium of claim 9, wherein generating for automatic display the media content information associated with the first media content and the prompt related to user interest in the first media content comprises identifying a suitable time to automatically display the media content information associated with the first media content and the prompt related to user interest in the first media content.

12. The non-transitory computer-readable storage medium of claim 9, wherein reducing the likelihood that the media content information associated with the second media content is automatically displayed includes forgoing generating for display by the second computer the media content information associated with the second media content.

13. The non-transitory computer-readable storage medium of claim 9, wherein the media content information associated with the first media content includes an advertisement associated with the first media content.

14. The non-transitory computer-readable storage medium of claim 9, wherein the media content information associated with the first media content includes real-time data associated with the first media content.

15. A device, comprising:
one or more processors;
memory; and
one or more programs, wherein the one or more programs are stored in the memory and configured to be executed by the one or more processors, the one or more programs comprising instructions for:
- determining that a first media content is potentially of interest to a user;
- generating media content information associated with the first media content;
- sending, using a communications network interface, the media content information associated with the first media content to a second computer associated with the user for automatic display;
- generate, for automatic display at the second computer, the media content information associated with the first media content and a prompt related to user interest in the first media content;
- receiving, from the second computer and using the communication network interface, a response to the prompt, the response comprising an indication that media content information related to the first media content should be less likely to be automatically displayed;
- identifying, using the one or more processors, a second media content associated with an attribute of the first media content; and
- reducing a likelihood that media content information related to associated with the second media content is automatically displayed to the user in the future based on the indication.

16. The device of claim 15, wherein reducing the likelihood that the media content information associated with the second media content is automatically displayed to the user in the future comprises preventing the media content information associated with the second media content from being automatically displayed.

17. The device of claim 15, wherein generating for automatic display the media content information associated with the first media content and the prompt related to user interest in the first media content comprises identifying a suitable time to automatically display the media content information associated with the first media content and the prompt related to user interest in the first media content.

18. The device of claim 15, wherein reducing the likelihood that the media content information associated with the second media content is automatically displayed includes forgoing generating for display by the second computer the media content information associated with the second media content.

19. The device of claim 15, wherein the media content information associated with the first media content includes an advertisement associated with the first media content.

20. The device of claim 15, wherein the media content information associated with the first media content includes real-time data associated with the first media content.

* * * * *

UNITED STATES PATENT AND TRADEMARK OFFICE
CERTIFICATE OF CORRECTION

PATENT NO. : 10,986,407 B2
APPLICATION NO. : 16/509312
DATED : April 20, 2021
INVENTOR(S) : Thomas E. Westberg Page 1 of 1

It is certified that error appears in the above-identified patent and that said Letters Patent is hereby corrected as shown below:

In the Claims

Claim 15, Column 24, Line 30, delete "related to"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*